(12) United States Patent
Turner et al.

(10) Patent No.: US 12,017,771 B2
(45) Date of Patent: Jun. 25, 2024

(54) SLAT-COVE FILLER FOR WING STRUCTURE OF AN AIRCRAFT

(71) Applicant: UNITED STATES OF AMERICA AS REPRESENTED BY THE ADMINISTRATOR OF NASA, Washington, DC (US)

(72) Inventors: Travis L Turner, Yorktown, VA (US); Scott E Brynildsen, Yorktown, VA (US); John W. Mulvaney, Yorktown, VA (US); Albert R. Allen, Yorktown, VA (US); David P Lockard, Hampton, VA (US); Craig L. Streett, Fairfax, VA (US); Mehdi R Khorrami, Norfolk, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 708 days.

(21) Appl. No.: 17/222,604

(22) Filed: Apr. 5, 2021

(65) Prior Publication Data

US 2021/0237850 A1 Aug. 5, 2021

Related U.S. Application Data

(63) Continuation-in-part of application No. 16/158,595, filed on Oct. 12, 2018, now Pat. No. 11,001,368.

(60) Provisional application No. 63/005,757, filed on Apr. 6, 2020, provisional application No. 62/571,315, filed on Oct. 12, 2017.

(51) Int. Cl.
 *B64C 9/24* (2006.01)
 *B64C 9/02* (2006.01)
 *B64C 9/08* (2006.01)

(52) U.S. Cl.
 CPC .............. *B64C 9/24* (2013.01); *B64C 9/02* (2013.01); *B64C 9/08* (2013.01)

(58) Field of Classification Search
 CPC .... B64C 9/22; B64C 9/24; B64C 9/26; B64C 9/34
 See application file for complete search history.

(56) References Cited

U.S. PATENT DOCUMENTS

| | | | | |
|---|---|---|---|---|
| 2,755,039 A * | 7/1956 | Davie, Jr. | ................ | B64C 9/24 244/187 |
| 6,286,790 B1 * | 9/2001 | Thorpe | .................... | B64C 9/24 244/214 |
| 6,394,396 B2 * | 5/2002 | Gleine | ..................... | B64C 3/46 244/1 N |

(Continued)

OTHER PUBLICATIONS

Khorrami et al. "Unsteady Flow Computations of a Slat with a Blunt Trailing Edge," AIAA Journal, , 2000, pp. 2050-2058, vol. 38, No. 11.

(Continued)

*Primary Examiner* — Philip J Bonzell
*Assistant Examiner* — Michael B. Kreiner
(74) *Attorney, Agent, or Firm* — M. Bruce Harper; Robin W. Edwards; Trenton J. Roche

(57) ABSTRACT

Methods, systems and devices of the various embodiments may provide slat-cove fillers configured to reduce leading-edge slat noise on aircraft, such as transport aircraft.

19 Claims, 17 Drawing Sheets
(6 of 17 Drawing Sheet(s) Filed in Color)

(56) References Cited

U.S. PATENT DOCUMENTS

| | | | |
|---|---|---|---|
| 6,457,680 B1* | 10/2002 | Dobrzynski | B64C 9/24 244/210 |
| 6,789,769 B2 | 9/2004 | Mau et al. | |
| 7,766,281 B2* | 8/2010 | Lorkowski | B64C 3/50 244/210 |
| 8,424,810 B1* | 4/2013 | Shmilovich | B64C 9/24 244/214 |
| 8,469,316 B2* | 6/2013 | Hirai | B64C 9/24 244/210 |
| 8,695,925 B2 | 4/2014 | Khorrami et al. | |
| 9,242,720 B2* | 1/2016 | Turner | B64C 9/22 |
| 11,427,303 B2* | 8/2022 | Dos Reis | B64C 21/02 |
| 2012/0097791 A1 | 4/2012 | Turner et al. | |
| 2015/0056453 A1 | 2/2015 | Kang et al. | |
| 2016/0137284 A1 | 5/2016 | Turner et al. | |
| 2020/0346735 A1* | 11/2020 | Dos Reis | B64C 9/22 |

OTHER PUBLICATIONS

Singer, B.A. et al. "Computational Aeroacoustic Analysis of Slat Trailing-Edge Flow," AIAA Journal, 2000, pp. 1558-1564, vol. 38, No. 9.

Khorrami, M. R. et al. "Time-accurate Simulations and Acoustic Analysis of Slat Free Shear Layer," AIAA Journal, 2002, pp. 1284-1291, vol. 40, No. 7.

Khorrami, M. R. et al. "Time-accurate Simulations and Acoustic Analysis of Slat Free Shear Layer: Part II," AIAA Journal, 2002, AIAA Paper 2002-2579.

Choudhari, M. et al. "Slat Cove Noise Modeling: A Posteriori Analysis of Unsteady RANS Simulations," AIAA Journal, 2002, AIAA Paper 2002-2468.

Streett, C. L. et al. "Aerodynamic Noise Reduction for High-Lift Devices on a Swept Wing Model," AIAA Journal, 2006, AIAA Paper 2006-212.

Imamura, T. et al. "Designing of Slat Cove Filler as a Noise Reduction Device for Leading-edge Slat," AIAA Journal, 2007, AIAA Paper 2007-3473.

Otsuka, K. et al. (Editor), Shape Memory Materials, Cambridge University Press, 1998, Cambridge, UK.

Lagoudas, D.C. (Editor), Shape Memory Alloys: Modeling and Engineering Applications, Springer Science +Business Media, 2008, LLC, New York, NY.

Lacy, Doug S. et al. Development of the High Lift Common Research Model (HL-CRM): A Representative High Lift Configuration for Transonic Transports, AIAA SciTech Forum, Jan. 4-8, 2016, AIAA 2016-0308, San Diego, CA.

Benafan, O. et al. "Shape Memory Alloy Actuator Design: CASMART Collaborative Best Practices and Case Studies," International Journal of Mechanics and Materials in Design, 2014, pp. 1-42, vol. 10(1), doi: 10.1007/s10999-013-9227-9.

Kang, J. H. et al. "Enhanced Adhesive Strength between Shape Memory Polymer Nanocomposite and Titanium Alloy," Composites Science & Technology, 96 (2014) pp. 23-30.

Smith, N. A. et al. "Improved adhesion between nickel-titanium shape memory alloy and a polymer matrix via silane coupling agents." Compos A Appl. Sci. 2004, pp. 1307-1312, vol. 35(11).

Scholten, W.D. et al. "Analysis-Driven Design Optimization of a SMA-Based Slat-Cove Filler for Aeroacoustic Noise Reduction," Proc. ASME 2013 Conf. on Smart Matl., Adaptive Struct. and Intell. Sys., Sep. 16-18, 2013, SMASIS2013-3104, Snowbird, UT.

Scholten, W.D. et al. "Development and Analysis-Driven Optimization of a Superelastic Slat-Cove Filler for Airframe Noise Reduction," AIAA Journal, Mar. 2016, pp. 1074-1090, vol. 54(3), doi: 10.2514/1.J054011.

Niu, M. C. Y. et al. "Airframe Structural Design" Conmilit Press Ltd., Jan. 1989, p. 327.

H. Ozcan et al. "Effects of cyclic heat treatment and aging on superelasticity in oligocrystalline Fe—Mn—Al—Ni shape memory alloy wires," Scripta Materialia, 2017, pp. 66-70, vol. 134.

Sreekantamurthy, T. et al. "Elastomeric Structural Attachment Concepts for Aircraft Flap Noise Reduction—Challenges and Approaches to Hyperelastic Structural Modeling and Analysis," AIAA-2014-0509, AIAA SciTech 2014 Forum, Jan. 13-17, 2014, National Harbor, Maryland.

* cited by examiner

SLAT-COVE FILLER FOR WING STRUCTURE OF AN AIRCRAFT

CROSS-REFERENCE TO RELATED PATENT APPLICATION(S)

This patent application is a continuation-in-part of U.S. patent application Ser. No. 16/158,595 filed on Oct. 12, 2018, which claims the benefit of and priority to U.S. Provisional Patent Application No. 62/571,315 filed on Oct. 12, 2017; this application also claims the benefit of and priority to U.S. Provisional Patent Application No. 63/005,757 filed on Apr. 6, 2020, the contents of each of which are hereby incorporated by reference in their entireties.

STATEMENT REGARDING FEDERALLY SPONSORED RESEARCH OR DEVELOPMENT

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

BACKGROUND OF THE INVENTION

Airframe noise produced by unsteady air flow around aircraft structures is a significant source of aircraft noise during landing approach. Conventional leading-edge slat devices for high-lift are one such prominent source of airframe noise. Concepts for various devices, such as slat-cove fillers, have been proposed in an attempt to explore reductions in the noise associated with leading-edge slats. However, improvements in such devices, especially slat-cove fillers, are need to achieve practical implementation of noise reduction for leading-edge slats.

BRIEF SUMMARY OF THE INVENTION

Methods, systems and devices of the various embodiments may provide slat-cove fillers configured to reduce leading-edge slat noise on aircraft, such as transport aircraft. Various embodiments may provide advancements in slat-cove fillers and various embodiments may be applicable to any aircraft that employs a leading-edge, high lift device that is distinct from the primary (or main) wing structure. Various embodiments promote a tight nesting between the leading-edge slat and the primary wing structure in the retracted position. Various embodiments avoid significant variation across the span-wise sections of the various leading-edge slats or compromises in the slat-cove filler profile by shortening the effective curvilinear length of the slat-cove filler when stowed while enabling the stowage of an optimized slat-cove filler having a large actual curvilinear length. Various embodiments provide a sliding-flexure-hinge at the bottom of the leading-edge slat-cove wall that allows the slat-cove filler to slide into and out of an interior of the leading-edge slat.

Various embodiments may provide a wing structure for an aircraft including a primary wing structure, a leading-edge slat, and a slat-cove filler. The leading-edge slat may include a cove wall, a sliding-flexure-hinge extending from the cove wall, and an interior space within the leading-edge slat, wherein the leading-edge slat is configured to movably interconnect with the primary wing structure for movement between a retracted position and a deployed position. The slat-cove filler may include a flexible material and define a first shape when the leading-edge slat is in the deployed position and a second shape when the leading-edge slat is in the retracted position. A leading end of the slat-cove filler may be configured to slide along the sliding-flexure-hinge into the interior space when the leading-edge slat is moving toward the deployed position and out of the interior space when the leading-edge slat is moving toward the retracted position.

Various embodiments may include a wing structure for an aircraft having a primary wing structure, a leading-edge slat, and a slat-cove filler. The leading-edge slat may include a cove wall, a sliding-flexure-hinge extending from the cove wall, and an interior space within the leading-edge slat, wherein the leading-edge slat is configured to movably interconnect with the primary wing structure for movement between a retracted position and a deployed position. The slat-cove filler may include a flexible material and define a first shape when the leading-edge slat is in the deployed position and a second shape when the leading-edge slat is in the retracted position. A leading end of the slat-cove filler may be configured to slide along the sliding-flexure-hinge into the interior space when the leading-edge slat is moving toward the deployed position and out of the interior space when the leading-edge slat is moving toward the retracted position. The slat-cove filler may include an internal auxiliary slat-cove filler component with a first component end and a second component end. The internal auxiliary slat-cove filler component may thus be attached at the first end to a trailing portion of the slat-cove filler facing the cove wall and the second end to the cove wall forward of the attachment to the slat-cove filler. In this way, the internal auxiliary slat-cove filler component may be configured to be disposed in a curved manner in the interior space between the cove wall and slat-cove filler when the leading-edge slat is in the deployed position, with or defining at least one concavity of the internal auxiliary slat-cove filler component open to the cove wall. Some embodiments may include a mechanical stop/lock, such as a cam or actuator, at a leading end of the slat-cove filler. At least a portion of the slat-cove filler may be fabricated or comprised of a shape memory (SM) effect shape memory alloy (SMA) material. This material may be selected to have a predetermined application temperature below a finish temperature for transformation to martensite. Embodiments may be configured such that the application of heat to the at least a portion of the slat-cove filler causes the leading end of the slat-cove filler to slide along the sliding-flexure-hinge into the interior space when the leading-edge slat is moving toward the deployed position. Optionally, the application of heat to the at least a portion of the slat-cove filler further can be used to cause the slat-cover filler to achieve a desired shape relative to the wing structure. In some versions, the at least a portion of the slat-cove filler comprising shape memory (SM) effect shape memory alloy (SMA) material includes the internal auxiliary slat-cove filler component.

Various embodiments may provide a wing structure for an aircraft including a primary wing structure, a leading-edge slat, and a slat-cove filler. The leading-edge slat may include a cove wall, a sliding-flexure-hinge extending from the cove wall, and an interior space within the leading-edge slat, wherein the leading-edge slat is configured to movably interconnect with the primary wing structure for movement between a retracted position and a deployed position. The slat-cove filler may include a flexible material and define a first shape when the leading-edge slat is in the deployed position and a second shape when the leading-edge slat is in the retracted position. A leading end of the slat-cove filler may be configured to slide along the sliding-flexure-hinge into the interior space when the leading-edge slat is moving toward the deployed position and out of the interior space when the leading-edge slat is moving toward the retracted position. In such embodiments, at least a portion of the slat-cove filler may comprise shape memory (SM) effect shape memory alloy (SMA) material, wherein the shape memory (SM) effect shape memory alloy (SMA) material is selected to have a predetermined application temperature below a finish temperature for transformation to martensite. The at least a portion of the slat-cove filler comprising shape memory (SM) effect shape memory alloy (SMA) material may similarly be configured such that application of heat to the at least a portion of the slat-cove filler causes the leading end of the slat-cove filler to slide along the sliding-flexure-hinge into the interior space when the leading-edge slat is moving toward the deployed position. Optionally, the application of heat to the at least a portion of the slat-cove filler further may be used to cause the slat-cover filler to achieve a desired shape relative to the wing structure. Such embodiments may include a mechanical stop, a bulbous type sliding-flexure-hinge, a sliding-flexure-hinge including at least one roller in rolling engagement with the slat-cove filler, bias element configured to apply a bias force to the mechanical stop or directly to the leading end of the slat-cove filler itself, etc., as with other embodiments. These embodiments may further include a reverse internal auxiliary slat-cove filler component.

Similar to those in other embodiments, the slat-cove filler may include an internal auxiliary slat-cove filler component with a first component end and a second component end. The internal auxiliary slat-cove filler component may thus be attached at the first end to a trailing portion of the slat-cove filler facing the cove wall and the second end to the cove wall forward of the attachment to the slat-cove filler. In this way, the internal auxiliary slat-cove filler component may be configured to be disposed in a curved manner in the interior space between the cove wall and slat-cove filler when the leading-edge slat is in the deployed position, with or defining at least one concavity of the internal auxiliary slat-cove filler component open to the cove wall. Likewise, the at least a portion of the slat-cove filler comprising shape memory (SM) effect shape memory alloy (SMA) material may include the internal auxiliary slat-cove filler component.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The patent or application file contains at least one drawing executed in color. Copies of this patent or patent application publication with color drawings will be provided by the Office upon request and payment of the necessary fee.

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 2A:
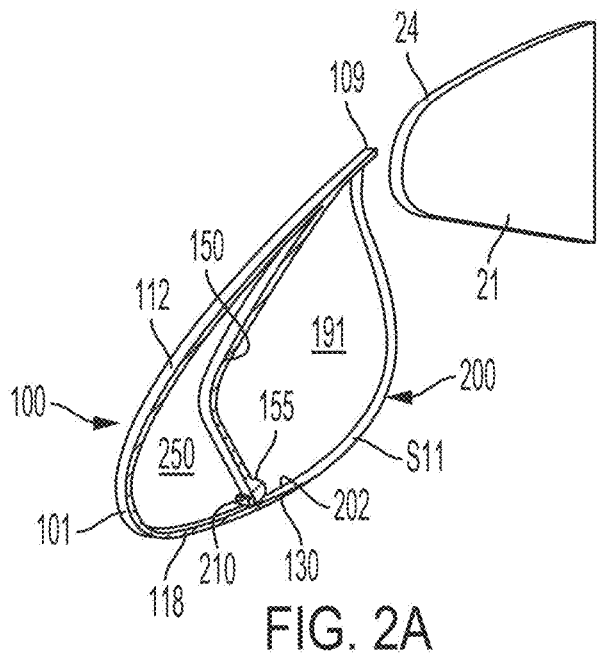
FIG. 2A is a partially fragmentary isometric view of a portion of a primary wing structure, a leading-edge slat with a sliding-flexure-hinge, and a sliding slat-cove filler, wherein the leading-edge slat is in a deployed position, in accordance with various embodiments.
Figure 2B:
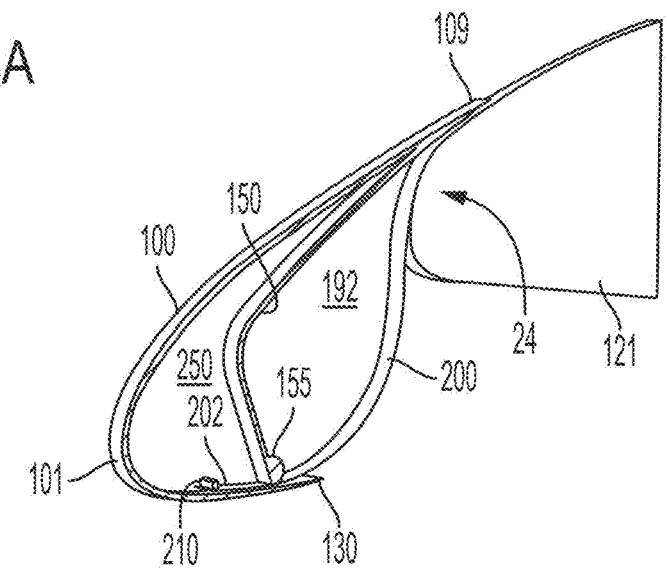
FIG. 2B is a partially fragmentary isometric view of a portion of the primary wing structure, leading-edge slat, and sliding slat-cove filler of FIG. 2A, wherein the leading-edge slat is in a configuration that is between a deployed position and a retracted position, in accordance with various embodiments.
Figure 2C:
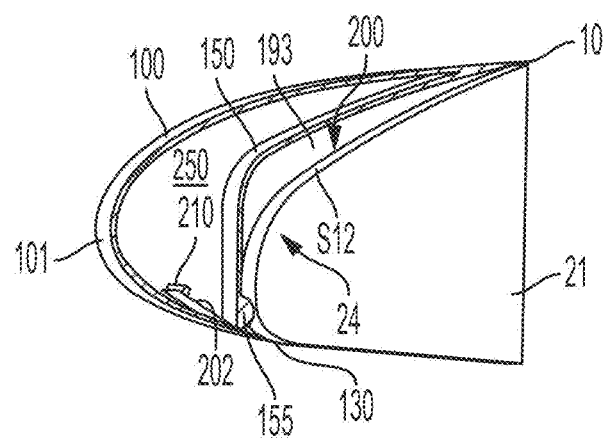
FIG. 2C is a partially fragmentary isometric view of a portion of the primary wing structure, leading-edge slat, and sliding slat-cove filler of FIGS. 2A-2B, wherein the leading-edge slat is in the retracted position, in accordance with various embodiments.
Figure 2D:
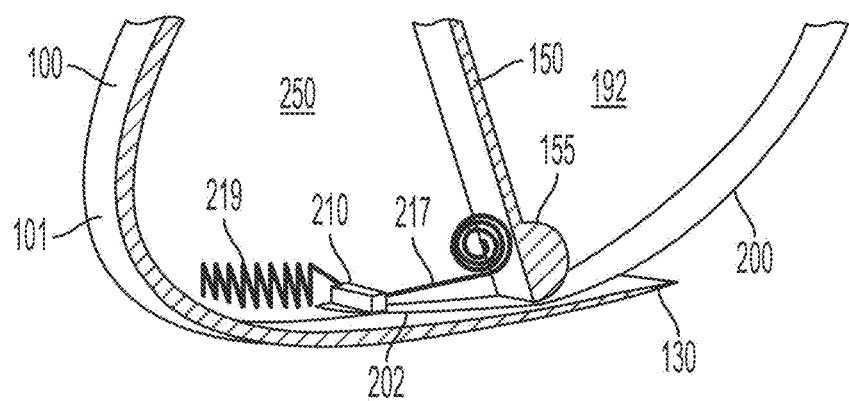
FIG. 2D is a partially fragmentary isometric zoomed-in view of a sub-portion of the leading-edge slat and sliding slat-cove filler of FIG. 2B including an optional bias element, wherein the leading-edge slat is in a configuration that is between a deployed position and a retracted position, in accordance with various embodiments.

For purposes of description herein, the terms "upper," "lower," "right," "left," "rear," "rearwardly," "front," "forward," "chord-wise," "span-wise," "vertical," "horizontal," and derivatives thereof shall relate to the invention as oriented in FIGS. 2A-2C. However, it is to be understood that the invention may assume various alternative orientations and step sequences, except where expressly specified to the contrary. For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. References made to particular examples and implementations are for illustrative purposes and are not intended to limit the scope of the invention or the claims.

A conventional wing assembly, as illustrated in FIGS. 1A-1D, includes a primary wing structure 21 and a conventional leading-edge slat 22 positioned adjacent and forward of a leading-edge 24 of the primary wing structure 21. In the orientation shown in FIGS. 1A-1D, air 5 flows from left to right (e.g., against a direction of flight), such that a forward direction faces left and a rearward direction faces right. The primary wing structure 21 may comprise a known aircraft wing having a leading-edge 24, a trailing edge (not shown), an upper surface, and a lower surface. The upper and lower surfaces of the primary wing structure 21 extend between the leading and trailing edges to define a first airfoil element.

The conventional leading-edge slat 22 may include an upper surface, a lower surface, and a cove wall 42 extending between the upper and lower surfaces on the back side of the conventional leading-edge slat 22. The upper surface of the conventional leading-edge slat 22 extends rearwardly toward the primary wing structure 21 from a leading edge 51 to a slat trailing edge 25. The lower surface of the conventional leading-edge slat 22 extends rearwardly from the leading edge 51 to a cusp 26 (i.e., a pointed end where two curves meet). The conventional leading-edge slat 22 may be movably interconnected with the primary wing structure 21 by various known mechanisms. Such mechanisms shift/rotate the conventional leading-edge slat 22 between a deployed position (FIG. 1A) and a retracted position (FIG. 1D). The mechanisms may deploy or retract the conventional leading-edge slat 22 relative to the primary wing structure 21 when activated.

In flight, the conventional leading-edge slat 22 and the primary wing structure 21 together split the flow of air 5 at a stagnation point on a leading edge 51 of the conventional leading-edge slat 22. In this way, the flow of air 5 splits at the leading edge 51 and flows over an upper surface and under a lower surface of the conventional leading-edge slat 22. Vortical re-circulating flows, form in a cove region 35 behind a cove wall 42 of the conventional leading-edge slat 22, and may cause significant unsteady fluctuating flow, generating noise. In addition, the vortical re-circulating flows may cause the air that is forced through the gap between the leading-edge 24 of the primary wing structure 21 and the slat trailing edge 25 of the conventional leading-edge slat 22 to become unsteady, which may also be a source of airframe noise. Thus, in order to reduce or eliminate the vortical re-circulating flows, a slat-cove filler 23 may be attached to a back side of the conventional leading-edge slat 22. For example, the slat-cove filler 23 may be a slat-cove filler as described in U.S. Pat. No. 9,242,720 which is incorporated herein by reference in its entirety for all purposes.

The slat-cove filler 23 may be formed from a sheet of thin flexible material and fixedly secured to the conventional leading-edge slat 22 at or near both the slat trailing edge 25 and the cusp 26. The slat-cove filler 23 may comprise an elongated element extending along substantially the entire span-wise length of conventional leading-edge slat 22, or it may extend along only a portion or portions of conventional leading-edge slat 22. As the conventional leading-edge slat 22 moves from the deployed position (FIG. 1A) to the retracted position (FIG. 1D), the slat-cove filler 23 is deformed due to contact between the slat-cove filler 23 and leading-edge 24 of primary wing structure 21. The slat-cove filler 23 may be configured to autonomously move from a partially retracted configuration (FIG. 1C) to a more fully or completely deployed configuration (FIGS. 1A and 1B) as the slat-cove filler 23 passes through intermediate configurations. Thus, due to the flexible construction of the slat-cove filler 23, the slat-cove filler 23 may have a first shape S1 when the conventional leading-edge slat 22 is in the deployed position (FIG. 1A) and a second shape S2 when the conventional leading-edge slat 22 is in the retracted position (FIG. 1D). In addition, the slat-cove filler 23 may have a series of intermediate shapes (e.g., FIGS. 1B and 1C) as the conventional leading-edge slat 22 moves relative to the primary wing structure 21 between the deployed and retracted positions.

Figure 1A:
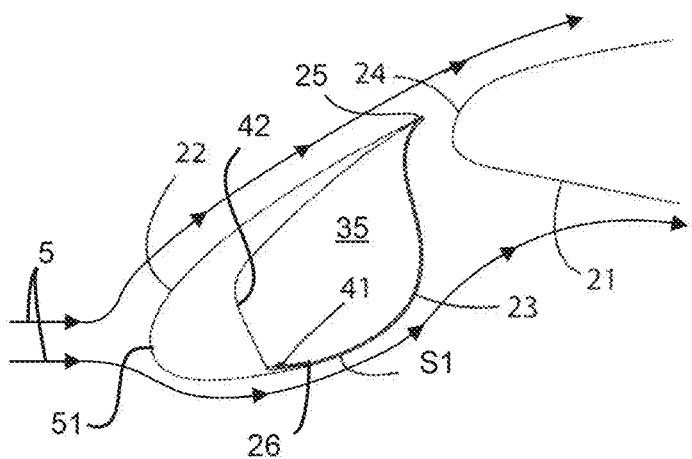
FIG. 1A is a partially fragmentary cross-sectional view of a conventional primary wing structure, leading-edge slat, and slat-cove filler, wherein the leading-edge slat is in a deployed position.

FIG. 1A illustrates the deployed position, in which the conventional leading-edge slat 22 has been moved (e.g., shifted and slightly rotated) downwardly and/or forwardly away from the leading-edge 24 of the primary wing structure 21. The slat-cove filler 23 may be biased to bulge rearwardly toward the primary wing structure 21 and block the flow of air 5 into the cove region 35. For example, a hinge 41, attaching the slat-cove filler 23 to the conventional leading-edge slat 22 at a position near the cusp 26, may encourage the slat-cove filler 23 into the first shape S1. The hinge 41 may have a torsion spring or the like that generates a torque acting on slat-cove filler 23 at the hinge 41. Alternatively, the slat-cove filler 23 itself may generate a leaf-spring force (i.e., restoring force due to strain energy) biasing it toward the deployed position. At least a portion of the slat-cove filler 23 may comprise a shape memory alloy (or SMA) that enables the slat-cove filler 23 to repeatedly change between the first shape S1 and the second shape S2 due to potentially large deformation required during the change. In the first shape S1, the slat-cove filler 23 includes a smoothly curved convex portion extending rearwardly from the cusp 26 and a concave curved portion adjacent the slat trailing edge 25. The first shape S1 may provide a profile or surface shape that is designed to eliminate unsteady flow between the primary wing structure 21 and the conventional leading-edge slat 22, thus maintaining an attached boundary layer on an outer surface of the slat-cove filler.

Figure 1B:
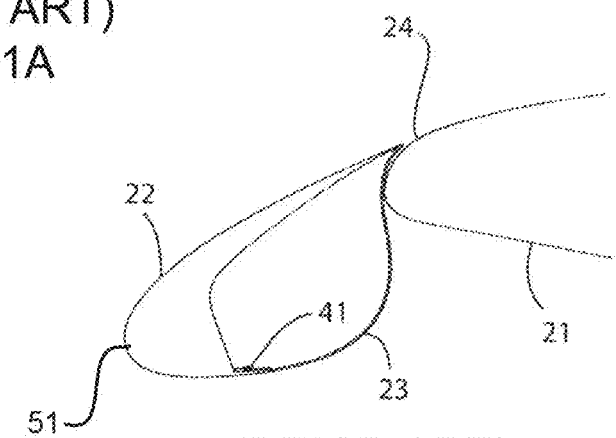
FIG. 1B is a partially fragmentary cross-sectional view of the conventional wing structure, leading-edge slat, and slat-cove filler of FIG. 1A, wherein the leading-edge slat is in a configuration that is between a deployed position and a retracted position.

FIG. 1B illustrates the conventional leading-edge slat 22 moved closer to the leading-edge 24 of the primary wing structure 21, such that the leading-edge 24 starts to contact a trailing end of the slat-cove filler 23. In this way, a portion of the slat-cove filler 23 contacts the primary wing structure 21 as the leading-edge slat moves from the deployed position to the retracted position.

Figure 1C:
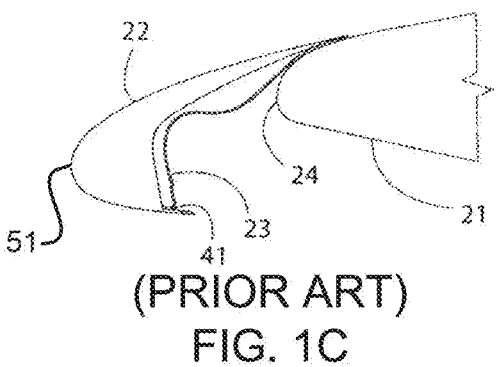
FIG. 1C is a partially fragmentary cross-sectional view of the conventional wing structure, leading-edge slat, and slat-cove filler of FIGS. 1A-1B, wherein the leading-edge slat is in a configuration that is intermediate to the position in FIG. 1B and the retracted position.
Figure 1D:
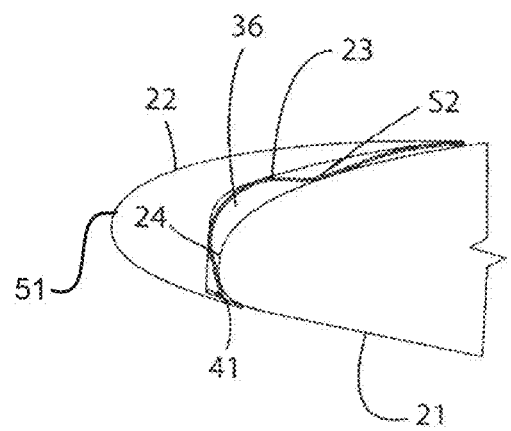
FIG. 1D is a partially fragmentary cross-sectional view of the conventional wing structure, leading-edge slat, and slat-cove filler of FIGS. 1A-1C, wherein the leading-edge slat is in the retracted position.

FIG. 1C illustrates the conventional leading-edge slat 22 moved even closer to the leading-edge 24 of the primary wing structure 21, such that the leading-edge 24 has deformed the slat-cove filler 23. The contact of the slat-cove filler 23 with the primary wing structure 21 causes the slat-cove filler 23 to change from the first shape S1 to the second shape S2. Depending on the type of material(s) used to form the slat-cove filler 23 and on details of the integration of the slat-cove filler 23 with the slat 22, the shape of the slat-cove filler 23 and the deformation therein may vary at intermediate stages of retraction. Similarly, the shape of the slat-cove filler 23 and the deformation therein may vary slightly in second shape S2, depending on material selection and structural integration details.

FIG. 1D illustrates the retracted position, in which the leading-edge 24 of the primary wing structure 21 is positioned directly adjacent to the conventional leading-edge slat 22 and nested in a cove region 36 thereof. In the retracted position, the leading-edge 24 is positioned directly adjacent to and nested in a cove region 36 of the conventional leading-edge slat 22.

The length of the slat-cove filler 23 and the curvature of the first shape S1 may be designed with aerodynamic considerations, such as to provide more steady or laminar flow under the conventional leading-edge slat 22. However, in the retracted position the slat-cove filler 23 as well as the front of the primary wing structure 21 must fit into the cove region 35. While shorter slat-cove fillers may stow easily, longer slat-cove fillers may not fit in the cove region 35. Thus, conventional slat-cove fillers may be restricted from having an optimal first shape in order to ensure a properly retracted position can be achieved between the primary wing structure and the leading-edge slat.

The systems, methods, and devices of the various embodiments may address the short-comings in previous slat-cove fillers and may achieve practical implementation of noise reduction for leading-edge slats. Various embodiments may provide advancements in slat-cove fillers and various embodiments may be applicable to any aircraft that employs a leading-edge, high lift device that is distinct from the primary wing structure.

Various embodiments promote a tight nesting between the leading-edge slat and the primary wing structure in the retracted position. In this way, any geometric discontinuity, such as a backward-facing step, is minimized to achieve a clean cruise geometry. Little to no clearance is typically preferred between a trailing edge of a leading-edge slat (hereinafter referred to as a "slat trailing edge") and the outer surfaces of the primary wing structure when the leading-edge slat is in the retracted position (i.e., a stowed configuration). Additionally, there is generally very little space to stow the bulk of a slat-cove filler behind the leading-edge slat in the retracted position, up against the primary wing structure. Thus, various embodiments provide modifications to the leading-edge slat that includes a sliding-flexure hinge and a sliding slat-cove filler.

Various embodiments avoid significant variation across the span-wise sections of the various leading-edge slats or compromises in the slat-cove filler profile by shortening the effective curvilinear length of the slat-cove filler when stowed while enabling the stowage of an optimized slat-cove filler having a large actual curvilinear length. In particular, various embodiments add sliding kinematics between the leading-edge stat and the slat-cove filler to reduce the effective curvilinear length of the slat-cove filler when stowed.

Various embodiments take advantage of contact forces between the primary wing structure and the slat-cove filler, which in the early stages of leading-edge slat retraction tend to push the slat-cove filler toward the leading-edge of the leading-edge slat. Additionally, there is room within the body of the leading-edge slat in which to stow excess material and keep it out of the air flow.

Various embodiments provide a sliding-flexure-hinge at the bottom of the leading-edge slat-cove wall that allows the slat-cove filler to slide under a bulbous base structure. The bulbous base structure may be circular or have a curvature distribution that promotes a desired combination of sliding and bending of the slate-cove filler. In addition, the bulbous base structure may minimize strain in the slat-cove filler as it bends around the bulbous base when being stowed. One end of the slat-cove filler may be in sliding engagement with the leading-edge slat at the cusp, with enough space under or through the bulbous base structure to allow the slat-cove filler to be readily pushed past the base of the slat-cove wall.

FIGS. 2A-2D illustrate an isometric view of a portion of a primary wing structure 21, a leading-edge slat 100 with a sliding-flexure-hinge 155, and a sliding slat-cove filler 200 in various positions, in accordance with various embodiments. In the orientation shown in FIGS. 2A-2D, air flows from left to right (e.g., against a direction of flight), such that a forward direction of the primary wing structure 21, the leading-edge slat 100 and the sliding slat-cove filler faces left and a rearward direction faces right.

In accordance with various embodiments, the leading-edge slat 100 is configured to movably interconnect with the primary wing structure 21 for movement from a retracted position (FIG. 2C) to a deployed position (FIG. 2A) and vice versa. The leading-edge slat 100 may be movably interconnected with the primary wing structure 21 by various mechanisms. The mechanisms may deploy or retract the leading-edge slat 100 relative to the primary wing structure 21 when activated. In the retracted position, the leading-edge slat 100 is positioned closer to a leading-edge 24 of the primary wing structure 21 than in the deployed position. The leading-edge slat 100 includes an upper surface 112, a lower surface 118, and a cove wall 150 extending between the upper and lower surfaces 112, 118. The upper surface 112 extends rearwardly toward the primary wing structure 21 from a leading edge 101 to a slat trailing edge 109. The lower surface 118 extends rearwardly from the leading edge 101 to a cusp 130.

In various embodiments, the leading-edge slat 100 may be configured such that a gap may be formed between the sliding-flexure-hinge 155 at the base structure of a cove wall 150 and an inner surface just forward of the cusp 130 and opposite a rearward portion of the lower surface 118 of the leading-edge slat 100. The gap may provide access to/from an interior space 250 of the leading-edge slat 100 forward of the cove wall 150 (i.e., interior to the leading-edge slat 100 and between the leading edge 101 and cove wall 150). The gap may be sized to allow a leading end 202 of the sliding slat-cove filler 200 to slide along the inner surface of the leading-edge slat 100 when moving between the retracted and deployed configurations. This sliding movement also slides the sliding slat-cove filler 200 over the cusp 130. The leading end 202 of the slat-cove filler 200 may slide through the gap formed between the sliding-flexure-hinge 155 at the base structure of the cove wall 150 and the inner surface just forward of the cusp 130 to extend and/or retract a portion of the sliding slat-cove filler 200, such as the leading end 202, into/out of the interior space 250 of the leading-edge slat 100. The interior space 250 of the leading-edge slat 100 may be an opening (or cavity) within the leading-edge slat 100 defined forward of the cove wall 150.

FIG. 2A illustrates a deployed position, in which the leading-edge slat 100 has been moved (e.g., shifted and slightly rotated) downwardly and/or forwardly away from the leading-edge 24 of the primary wing structure 21. The sliding slat-cove filler 200 may be formed from a resilient and flexible material that extends between the slat trailing edge 109 and the cusp 130. In addition, the sliding slat-cove filler 200 may comprise an elongated sheet-like element extending along substantially the entire span-wise length of the leading-edge slat 100, or it may extend along only a portion or portions of the leading-edge slat 100. The sliding slat-cove filler 200 may be biased to bulge rearwardly toward the primary wing structure 21 into a deployed shape S11 (i.e., a first shape) and block the flow of air into the cove region 191. The sliding slat-cove filler 200 itself may generate a leaf-spring force (i.e., restoring force due to strain energy) leveraged from the attachment to the slat trailing edge 109, biasing the sliding slat-cove filler 200 into the deployed shape S11. Alternatively, a hinge attaching the slat trailing edge 109 to the sliding slat-cove filler 200 may encourage the sliding slat-cove filler 200 into the deployed shape S11. The biasing force may be designed to keep the sliding slat-cove filler 200 deployed while under aerodynamic loads. Additional bias force to encourage the sliding slat cove filler 200 to maintain the deployed shape S11 against aerodynamic loads may be achieved by an optional bias element 217 or 219 (shown in FIG. 2D), such as a spring or similar provision, at the leading end 202 of the sliding slat-cove filler 200. As an example, the bias element may be a constant force spring pushing (e.g., bias element 219) or pulling (e.g., bias element 217) against the leading end 202 of the sliding slat-cove filler 200 to apply bias force to encourage the sliding slat cove filler 200 to maintain the deployed shape S11 against aerodynamic loads. As a specific example, the bias element 217 may be a coiled-strip spring pulling on the leading end 202 and applying constant force or constant torque attached to the inside of the cove wall 150 at its base so as to not interfere with the slat-cove filler 200 movement into the interior space 250. As another example, the bias element 219 may be a spring attached to the inside of the leading edge 101 and pushing on the leading end 202 with constant force. In some embodiments, only a single bias element, such as bias element 217 or bias element 219 may be provided to apply force to the leading end 202. In other embodiments, more than one bias element, such as bias element 217 and bias element 219 or any other type bias element, may be provided to apply force to the leading end 202. The leading end 202 of the sliding slat-cove filler 200 may also include a mechanical stop 210, which prevents the leading end 202 from sliding rearwardly past the sliding-flexure-hinge 155 at the base of the cove wall 150. The bias element 217 or 219 and mechanical stop 210 at the leading end 202 of the sliding slat-cove filler 200 may be integrated together. For example, the bias element 219 may be configured to apply the bias force to the mechanical stop 210 to thereby encourage the sliding slat cove filler 200 to maintain the deployed shape S11 against aerodynamic loads. In the deployed shape S11, the sliding slat-cove filler 200 may include a smoothly curved convex portion extending rearwardly from the cusp 130 and a concave curved portion adjacent the slat trailing edge 109. The bias element 217 or 219 may be configured such that the constant force/torque applied by the bias element 217 or 219 to the slat-cove filler 200 leading end 202 and/or the mechanical stop 210 may keep the slat-cove filler 200 deployed when the leading-edge slat 100 is deployed but not increase as the slat-cover filler 200 extends into the interior space 250 during leading-edge slat 100 retraction. In this manner, the bias may only be that required to keep the slat-cove filler 200 from collapsing under aero-load and minimal additional force may be needed to stow the slat-cove filler when the leading-edge slat 100 retracts. The deployed shape S11 may provide a profile or surface shape that is designed to eliminate unsteady flow between the primary wing structure 21 and the leading-edge slat 100, thus maintaining an attached boundary layer on an outer surface of the sliding slat-cove filler 200.

FIG. 2B illustrates the leading-edge slat 100 moved closer to the leading-edge 24 of the primary wing structure 21, such that the leading-edge 24 starts to contact and push on a trailing end of the sliding slat-cove filler 200. In this way, a portion of the sliding slat-cove filler 200 may be pushed past and between the sliding-flexure-hinge 155 and the inner surface of the leading-edge slat 100 just forward of the cusp 130. As such, when the leading-edge slat 100 is moving toward a retracted position (FIG. 2C), the leading end 202 of the sliding slat-cove filler 200 may slide along the underside of the sliding-flexure-hinge 155 through the gap under the sliding-flexure-hinge 155 and into the interior space 250 of the leading-edge slat 100, reducing the length of the sliding slat-cove filler 200 extending rearward from the sliding-flexure-hinge 155 as compared to the deployed position (FIG. 2A) of the leading-edge slat 100. As the remaining length of the sliding slat-cove filler 200 rearward of the sliding-flexure-hinge 155 is now less than it was in the deployed configuration, the exposed or effective length of the sliding slat-cove filler 200 is commensurate with the reduced cove region 192 between the cove wall 150 and the leading edge 24 of the primary wing structure 21, which is also smaller than it was in the deployed configuration.

FIG. 2C illustrates the leading-edge slat 100 in the retracted position, such that the leading-edge 24 has pushed and deformed the sliding slat-cove filler 200 into a retracted shape S12 (i.e., a second shape). In the retracted shape S12, the sliding slat-cove filler 200 may extend even further forward of the sliding-flexure-hinge 155, bend around the base of the sliding-flexure-hinge 155, and then nominally follows the contour of the leading-edge 24 of the primary wing structure 21 up to the slat trailing edge 109. As the remaining length of the sliding slat-cove filler 200 rearward of the sliding-flexure-hinge 155 is now even less than it was in FIG. 2B, the exposed or effective length of the sliding slat-cove filler 200 is commensurate with the fully reduced cove region 193 between the cove wall 150 and the leading edge 24 of the primary wing structure 21, which is also even smaller. The resilient and flexible construction of sliding slat-cove filler 200 combined with the ability to at least partially slide past the base of the cove wall 150 (i.e., through the gap between the sliding-flexure-hinge 155 and the inner surface just forward of the cusp 130) allows the remaining portions of the sliding slat-cove filler 200 to fit in the fully reduced cove region 193 between the leading-edge 24 of the primary wing structure 21 and the cove wall 150. At least a portion of the slat-cove filler 200 may comprise an SMA that enables the slat-cove filler 200 to repeatedly change between the deployed shape S11 and the retracted shape S12 due to potentially large deformation required during the change.

In accordance with various embodiments, in addition to being configured to partially stow inside the interior space 250 within the leading-edge slat 100, the sliding slat-cove filler 200 may be configured to autonomously move back from a fully retracted configuration (FIG. 2C) or a partially retracted configuration (FIG. 2B) to a more fully or completely deployed configuration (FIG. 2A). As such, the leading end 202 of the sliding slat-cove filler 200 may deploy or retract out of the interior space 250 through the gap under the sliding-flexure-hinge 155 until the mechanical stop 210 contacts the sliding-flexure-hinge 155 when the leading-edge slat 100 is moving toward the deployed configuration (FIG. 2A). As the mechanical stop 210 may have a height larger than the gap under the sliding-flexure-hinge 155, the mechanical stop 210 may be held within the interior space 250 by the sliding-flexure-hinge 155 and may prevent the sliding slat-cove filler 200 from disengaging from the leading-edge slat 100.

Figure 3:
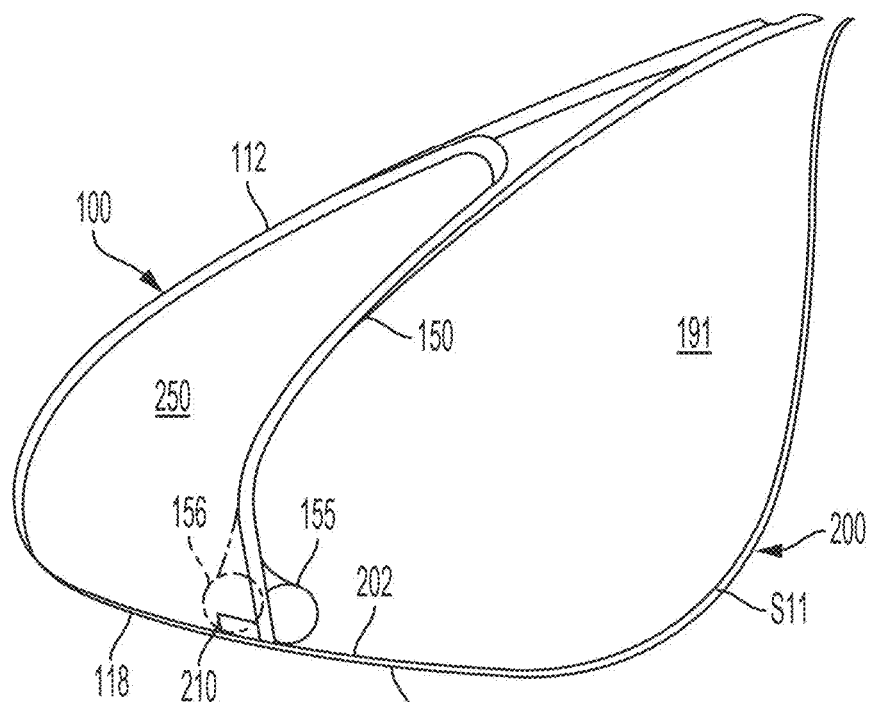
FIG. 3 is a partially fragmentary cross-sectional view of a leading-edge slat with a bulbous sliding-flexure-hinge securing a sliding slat-cove filler that is also attached to a slat trailing edge, in accordance with various embodiments.

FIG. 3 illustrates a leading-edge slat 100 with a bulbous type sliding-flexure-hinge 155 securing the sliding slat-cove filler 200 that is also attached to the slat trailing edge, in accordance with various embodiments. The leading end of the sliding slat-cove filler 200 is constrained to slide along an upward facing surface inside a lower part of the leading-edge slat 100 by the sliding-flexure-hinge 155 forming the base structure of the cove wall 150. The sliding-flexure-hinge 155 may be suspended over the inside lower part of the leading-edge slat 100 at the base of the cove wall 150 such that a gap (e.g., opening) is formed allowing access to the interior space 250. During retraction/deployment, the leading end of the sliding slat-cove filler 200 slides along the sliding-flexure-hinge 155 into/out of the interior space 250 of the leading-edge slat 100. In various embodiments, the sliding-flexure-hinge 155 protrudes rearwardly from the base of the cove wall 150. In particular, the protruding elements of the sliding-flexure-hinge 155 may have a bulbous shape. The shape of the sliding-flexure-hinge 155 may be such that an acceptable strain level is never exceeded in the sliding slat-cove filler 200 as it is bent around the bulbous shape as it enters the retracted configuration. The bulbous shape may protrude rearwardly from the base of the cove wall 150 more or less than that shown in order to adjust the maximum level of strain imparted on the sliding slat-cove filler 200. For example, the bulbous formation may even be positioned as far forward as to be completely embedded (i.e., flush) in the cove wall 150 (shown as sliding-flexure-hinge 156 in phantom dash-dot lines in FIG. 3). FIG. 3 also shows the interaction of the leading end of the sliding slat-cove filler 200, which may include a mechanical stop 210 preventing the leading end from sliding rearwardly past sliding-flexure-hinge 155. Additionally, the sliding slat-cove filler 200 may include a bias element, such as bias element 217 or 219, that encourages the sliding slat-cove filler 200 to maintain a deployed position under aerodynamic loads and that may keep the mechanical stop 210 in its fully deployed position at the sliding-flexure-hinge 155. The bias element and stop 210 may be integrated such as may be achieved with a constant force spring pushing (or pulling) on the stop 210. Mechanical stop 210 may be selected from a variety of mechanical elements, including for example, a cam mechanism or actuator permitting deployment and retraction of slat-cove filler 200 with low resistance, but operating to maintain slat-cove filler 200 in a desired deployed position until released. Another example of a mechanical stop 210 may be a solenoid activated lock.

Figure 4:
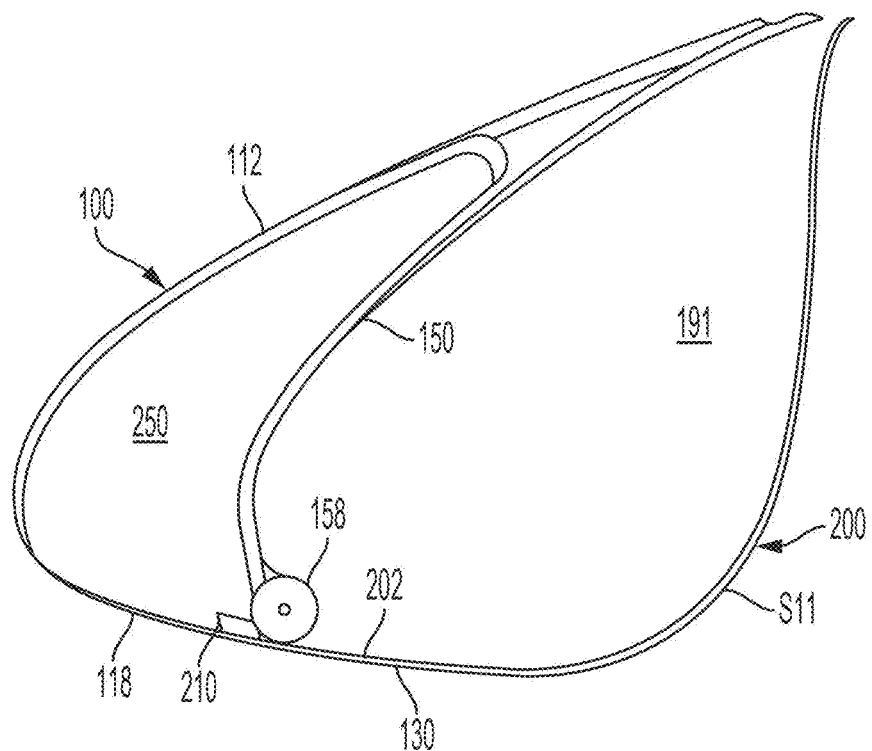
FIG. 4 is a partially fragmentary cross-sectional view of a leading-edge slat with a roller-type sliding-flexure-hinge securing a sliding slat-cove filler that is also attached to a slat trailing edge, in accordance with various embodiments.
Figure 5:
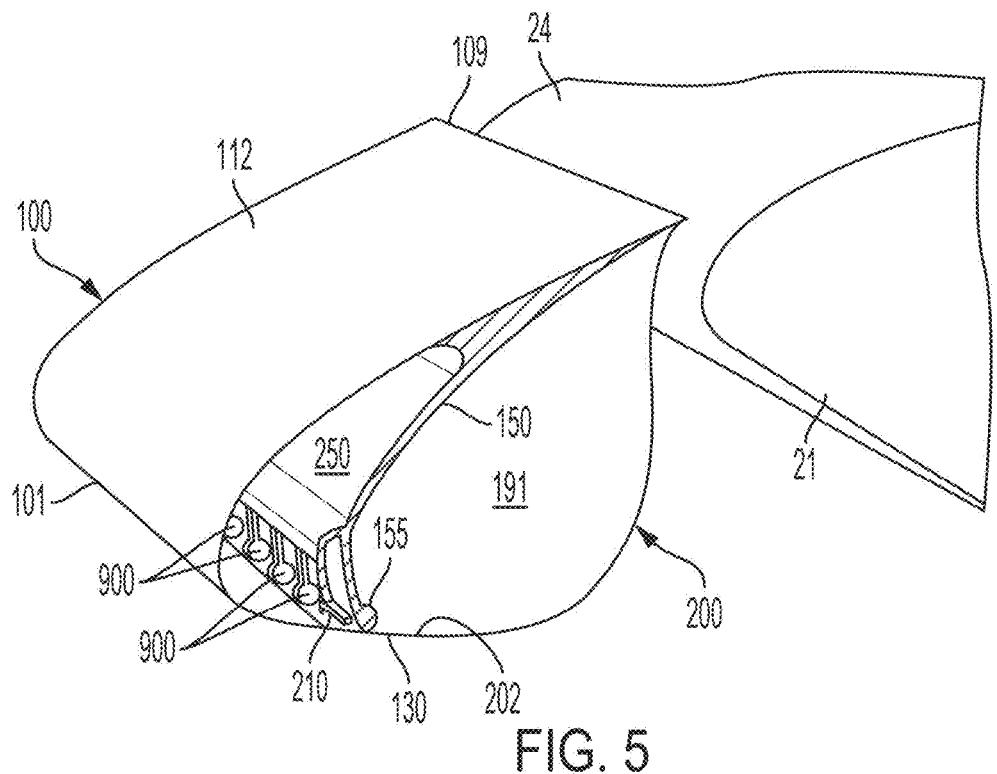
FIG. 5 is a partially fragmentary isometric view of a portion of a primary wing structure, a leading-edge slat, and a slat-cove filler, wherein the leading-edge slat includes a series of tightly spaced stabilizers extending forward of a base structure of a cove wall, in accordance with various embodiments.

FIG. 4 illustrates the leading-edge slat 100 with a roller-type sliding-flexure-hinge 158 securing the sliding slat-cove filler 200, in accordance with various embodiments. The base structure includes at least one roller in rolling engagement with the slat-cove filler 200. The roller-type sliding-flexure-hinge 158 may be suspended over the inside lower part of the leading-edge slat 100 at the base of the cove wall 150 such that a gap (e.g., opening) is formed between the at least one roller and the lower part of the leading-edge slat 100 allowing access to the interior space 250. The size of the gap may be selected to match or nearly match the thickness of the slat-cove filler 200. Contact between the sliding slat-cove filler 200 and the facing surface inside a lower part of the leading-edge slat 100 during retraction will automatically push a length of sliding slat-cove filler 200 along the at least one roller of the roller-type sliding-flexure-hinge 158 and past the cove wall 150 and into the interior space 250 in the slat body, the extent of which may vary with span-wise position. The remaining sliding slat-cove filler 200 chord-wise length that is exposed will bend in unison around the primary wing structure and roller-type sliding-flexure-hinge 158. Rollers may aid in the balance of kinematics and deformation by allowing the sliding slat-cove filler 200 to move freely as needed without binding or jamming. Also, the span-wise variation in the sliding motion could skew the lateral and forward edges of the sliding slat-cove filler 200. Such skewing motion may be better accommodated by the low-friction interaction of a roller. Like the embedded version of the sliding-flexure-hinge described above (156), the roller-type sliding-flexure-hinge 158 may be positioned further forward and may even be completely embedded (i.e., flush) in the cove wall 150. The at least one roller in the roller-type sliding-flexure-hinge 158 may include provisions to become part of mechanical stop 210 whereby the at least one roller permits deployment and retraction of slat-cove filler 200 with low resistance, but operating to maintain slat-cove filler 200 in a desired position until released FIG. 5 illustrates the primary wing structure 21, the leading-edge slat 100, and the slat-cove filler 200, wherein the leading-edge slat 100 includes at least one stabilizer, such as a series of tightly spaced stabilizers 900, extending forward of the sliding-flexure-hinge 155 of the cove wall 150, in accordance with various embodiments. One or more stabilizers 900 positioned forward of the sliding-flexure-hinge 155 may provide increased constraint and bending rigidity to resist rotation of the forward end of the sliding slat-cove filler 200 when in the deployed configuration and exposed to aerodynamic loads.

The series of tightly spaced stabilizers 900 may comprise of one or more rows of bulbous protrusions and/or rollers suitably placed and shaped so as to hold the leading portions of the sliding slat-cove filler 200 against the inner surface of the lower portion of the leading-edge slat. The series of tightly spaced stabilizers 900 may provide a second row of bulbous protrusions and/or rollers forward of the sliding-flexure-hinge 155, which may be formed as a first row of bulbous protrusions and/or rollers. In some embodiments, the series of tightly spaced stabilizers 900 may be staggered (i.e., in a zigzag order so they are not aligned in a chord-wise direction) relative to the series of elements forming the sliding-flexure-hinge 155. The series of tightly spaced stabilizers 900 is configured to engage the sliding slat-cove filler 200 on a forward surface thereof that is offset in a chord-wise direction from a rearward surface of the sliding slat-cove filler 200 engaged by the sliding-flexure-hinge 155. The spacing between the forward and aft bulb/roller rows may be kept to a minimum to reduce the chord-wise length of sliding slat-cove filler 200 that is entrapped in the sliding constraint in the deployed configuration so that the amount of travel and stowage capacity is maximized when retracted. Similar to the gap formed under the elements of the sliding-flexure hinge 155, gaps may be formed under the stabilizers 900 to allow the sliding slat-cove filler 200 to slide into and out of the interior space 250.

In various embodiments, the bulbs/rollers forming the sliding-flexure-hinge 155 may have a larger and variable radius of curvature to increase mobility of the sliding slat-cove filler 200, particularly as it assumes an inclined orientation to the cove wall 150 due to contact with the primary wing structure 21, and facilitate ingress in and egress from the inner regions of the leading-edge slat 100 throughout the stowage process as sliding and bending continuously adjust to satisfy equilibrium as necessary.

Figure 6:
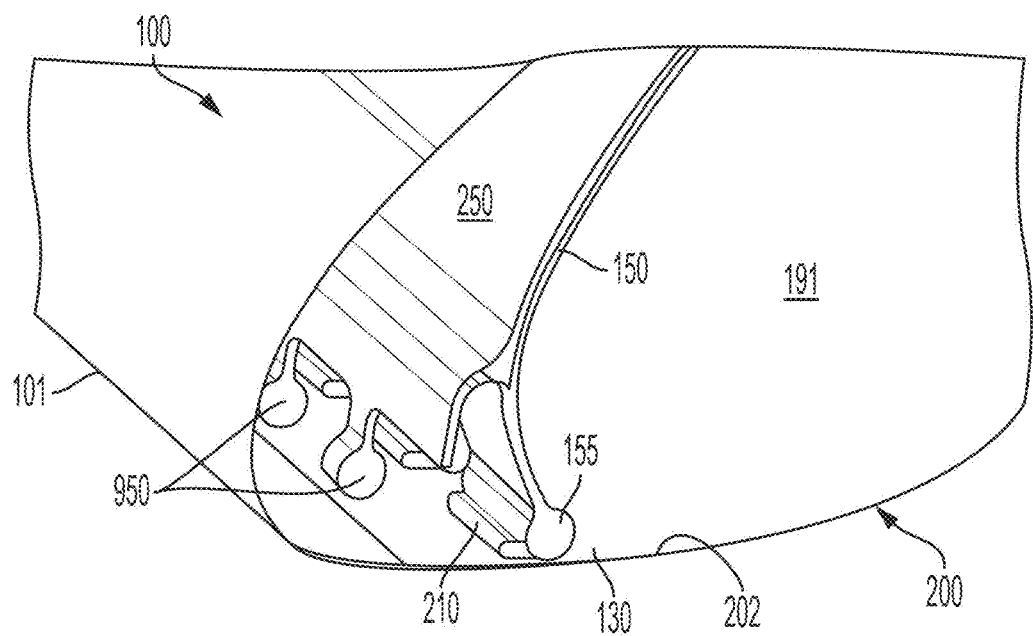
FIG. 6 is a partially fragmentary isometric close-up view of a portion of a leading-edge slat and a slat-cove filler, wherein the leading-edge slat includes a series of loosely spaced stabilizers extending forward of a base structure of a cove wall, in accordance with various embodiments.

FIG. 6 illustrates a portion of a leading-edge slat 100 and a sliding slat-cove filler 200, wherein the leading-edge slat 100 includes a series of loosely spaced stabilizers 950 extending forward of the sliding-flexure-hinge 155 of the cove wall 150, in accordance with various embodiments. The series of loosely spaced stabilizers 950 demonstrate that the size, spacing, and relative locations of such stabilizers may be changed to accommodate particular regional conditions and/or special characteristics of an aircraft or airfoil. The loosely spaced stabilizers 950 may be variations of the stabilizers 900 described with reference to FIG. 5. As shown in FIG. 6, spaces in the mechanical stop 210 may allow the sliding slat-cove filler 200 to slide reward past the stabilizers 900, 950 while still mechanically engaging with the sliding-flexure-hinge 155 to stop rearward travel of the sliding slat-cove filler 200. A forward bias element, such as a constant force spring, may also be integrated with the mechanical stop to aid the system in maintaining the deployed configuration against aerodynamic loads.

Figure 7:
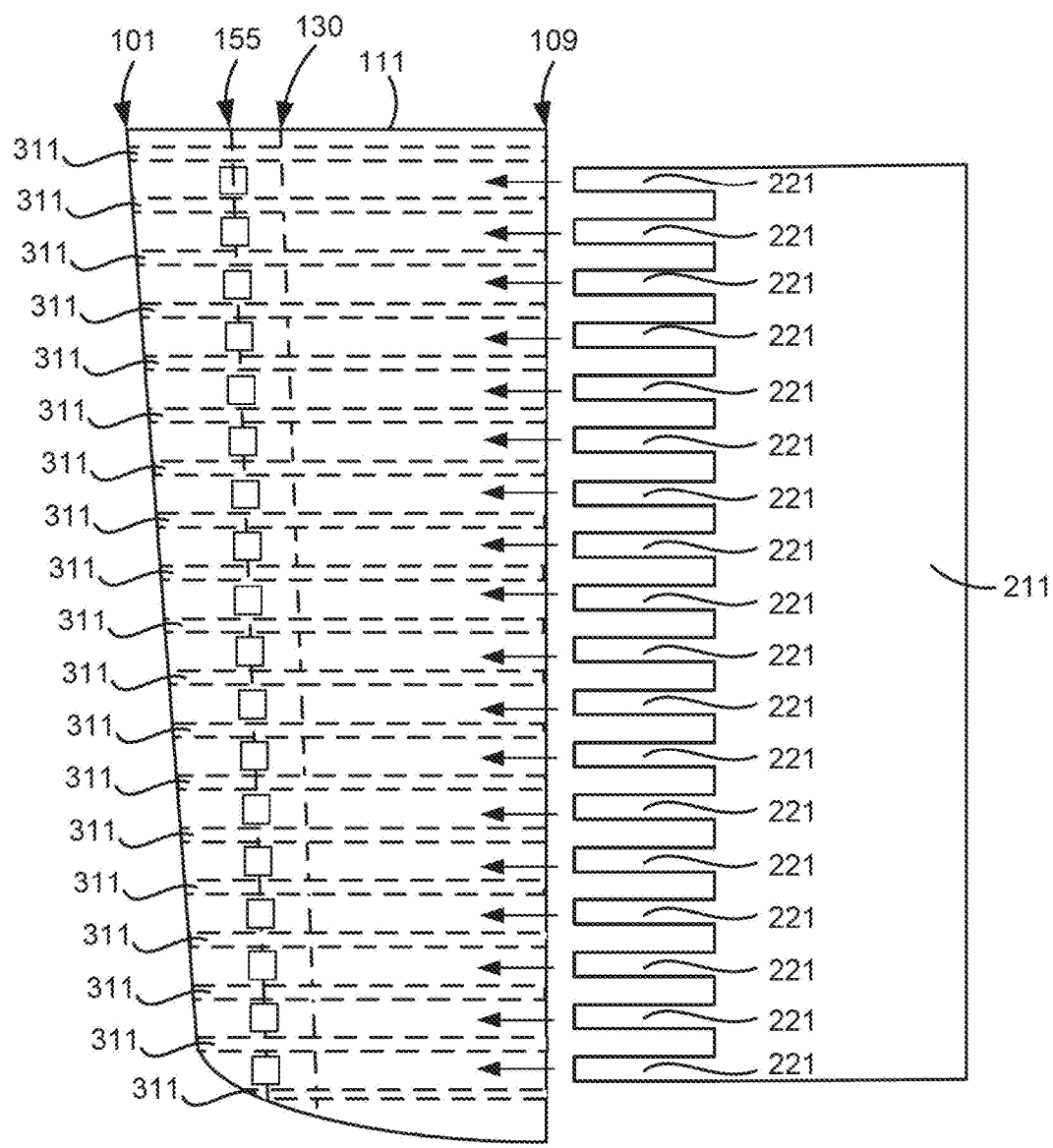
FIG. 7 a partially fragmentary plan view of a leading-edge slat separated from a sliding slat-cove filler configured with tongues to avoid interference with a rib structure of the leading-edge slat, in accordance with various embodiments.

FIG. 7 illustrates a planform view of leading-edge slat segment 111 separated from a sliding slat-cove filler 211 configured with tongues 221 to avoid interference with a series of ribs 311 supporting the leading-edge slat segment 111, in accordance with various embodiments. Often the leading-edge slat segment 111 may include a series of ribs 311 extending in the forward-aft direction in each slat segment that define the outer mold line for the skin of the leading-edge slat segment 111. The rib spacing might be smaller than that shown in FIG. 7 for modern aircraft and/or it might be increased with modern aircraft materials, e.g., composites, or construction techniques, e.g., sandwich-type structure for skin, etc. It is envisioned that the gap under each of the sliding-flexure-hinges 155 (i.e., at the base of the slat-cove wall), may exist between each pair of ribs 311. In accordance with various embodiments, the sliding slat-cove filler 211 may maintain structural continuity over the slat span and slide as desired under each of the sliding-flexure-hinges 155 by shaping a leading-end of the sliding slat-cove filler 211 with tongues 221 that may be inserted into the gaps between each pair of ribs 311 and cutouts between the tongues 221 that allow the sliding slat-cove filler to avoid interference with the ribs during movement between the deployed and retracted configurations. Each cutout may only need to be as long (chord-wise) as the sliding movement at that span-wise location requires. The cutout length at a given span-wise station may be totally or partly hidden from the flow of air by the cusp 130. Any cutout length that protrudes past the cusp 130 in the deployed configuration, and is thus exposed to flow, may be filled with a brush seal or other treatment. It might also be possible to adjust the chord-wise position of the slat-cove-wall slightly to adjust the ratio of slat-interior volume to cusp tang length in order to balance sliding slat-cove filler 211 stowage and cutout shielding lengths as a function of span-wise position.

Rollers or appropriately shaped bulb(s) at the base of the sliding-flexure-hinges 155, 156, 158 may aid in this balance of kinematics and deformation by allowing the sliding slat-cove filler 211 to freely move as needed without binding or jamming. Also, the span-wise variation in the sliding motion could skew the lateral and forward edges of the sliding slat-cove filler 211. The width of the sliding slat-cove filler 211 cutouts may be defined by the span-wise dimension of the ribs 311 and by incorporating sliding-motion skewness to prevent the tongues 221 from contacting the ribs 311.

Figure 8:
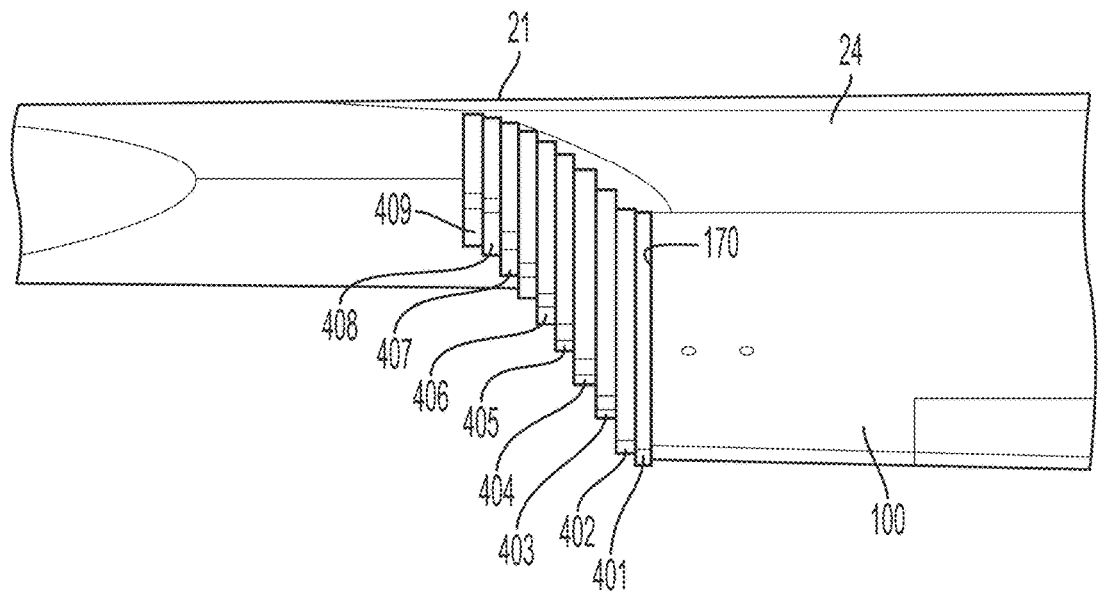
FIG. 8 is a front view of a leading-edge slat in a deployed configuration with a set of nesting side plates enclosing an end of the leading-edge slat and connecting/transitioning to the primary wing structure, in accordance with various embodiments.
Figure 9:
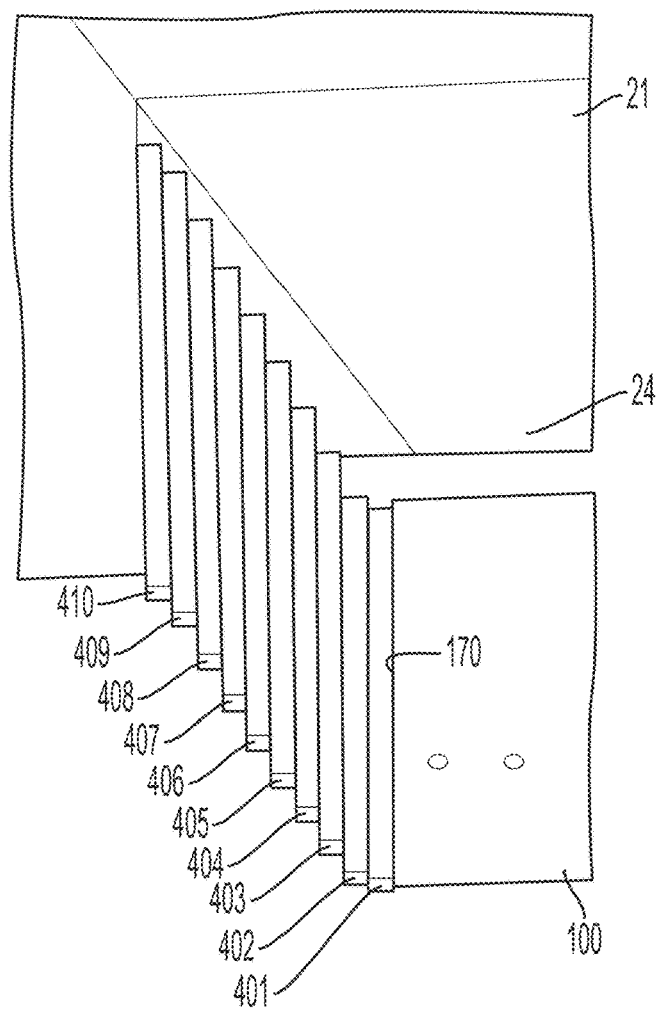
FIG. 9 is a top view of a leading-edge slat in the deployed configuration with the set of nesting side plates in FIG. 8 enclosing the end of the leading-edge slat and connecting/transitioning to the primary wing structure, in accordance with various embodiments.

FIGS. 8 and 9 illustrate a front and top view, respectively, of a leading-edge slat 100 in a deployed configuration with a set of nesting side plates mounted so as to enclose an end of the leading-edge slat and connecting/transitioning to the primary wing structure, in accordance with various embodiments. Various embodiments may include structures for closing the span-wise ends of the leading-edge slats 100, e.g., the lateral edge 170. Closing off the lateral edges of each leading-edge slats with side plates 401-410 may better eliminate known sources of noise. In addition, adding side plates 401-410 to the slat side edges may provide a structural link between each slat side edge and a surface of the primary wing structure 21 that supports the leading-edge slat 100. Similarly, treatment of the sliding slat-cove filler ends may be simultaneously achieved using the side plates 401-410.

A first plate 401, attached to the lateral edge 170, may have a profile of the combined leading-edge slat 100 and the deployed slat-cove filler outer mold line so that the cove region between the sliding slat-cove filler and the slat is enclosed. The cove region may be sealed-off using a rubber bulb seal, brush seal, or other provision. The remaining plates (e.g., 402-410) need not include the profile of the sliding slat-cove filler, but only need to suitably transition from one plate to the next, through to the last plate 410, which is attached to the primary wing structure 21. In this way, edges, gaps, cavities, etc. are minimized to prevent the production of unsteady flow mechanisms. Interlocking slots and pins in the side plates 401-410 may enforce equal movement of each plate. In addition, the throw of each side plates 401-410 may be mechanically programmed to execute sequentially or simultaneously. Additional constraints and load-bearing (lift and drag) capability may be enabled by passing a telescoping rod, or other provision that is secured to the leading-edge slat 100 and primary wing structure, at the ends, through the stack of slide plates 401-410. The aft edge of the first side plate 401, may have the full section of the corresponding leading-edge slat 100 and slat-cove filler profile and may then fit into a matching slot in the leading-edge of the primary wing structure when the leading-edge slat 100 is retracted (i.e., analogous to primary wing structure penetrations for slat actuator and deicing ducting).

Figure 10:
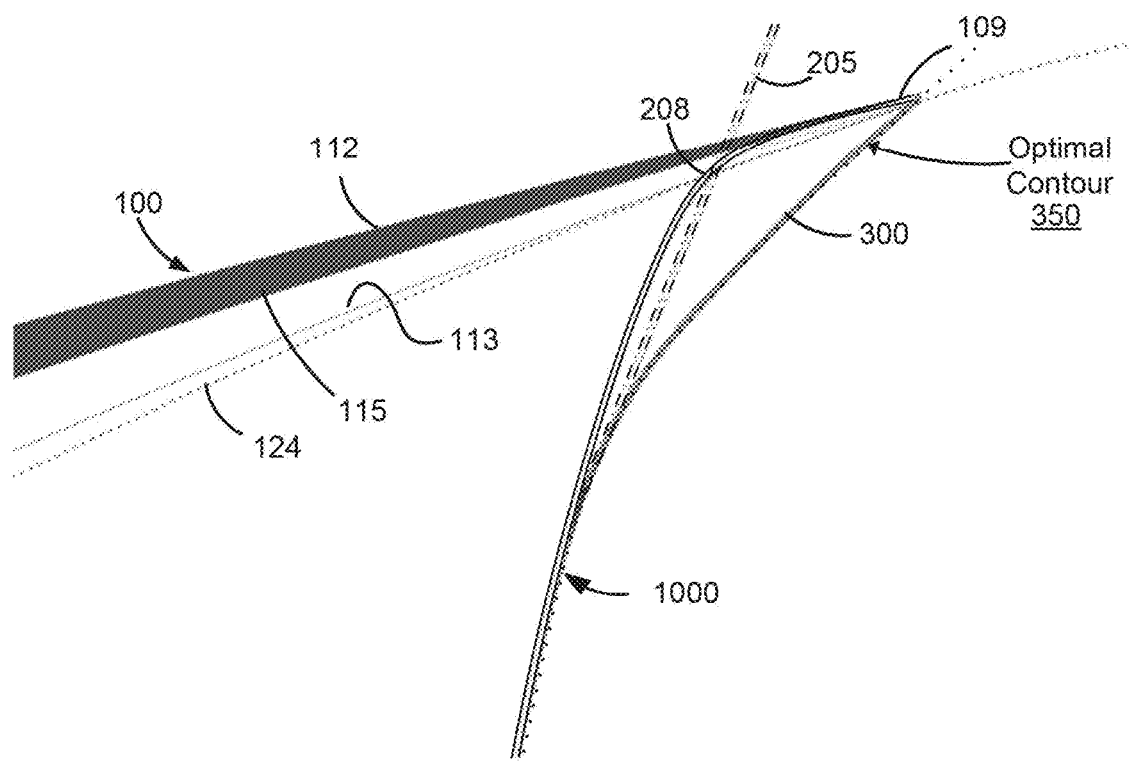
FIG. 10 is a partially fragmentary cross-sectional view of a shape-set trailing end of a sliding slat-cove filler attached to a slat trailing edge along with an external auxiliary slat-cove filler component, in accordance with various embodiments.

FIG. 10 illustrates a shape set trailing end of a slat-cove filler 1000 attached to the slat trailing edge 109 along with an external auxiliary slat-cove filler component 300, in accordance with various embodiments. Slat-cove filler 1000 may be any type slat-cove filler, such as slat-cove filler 23, slat-cove filler 200, slat-cove filler 211, etc. and as such the various embodiments discussed with reference to FIGS. 10-13 may be applied to any type slat-cove filler. FIG. 10 illustrates a portion of the primary wing structure surface 124 in phantom single dashed line. An optimal contour 350 for some slat-cove filler implementations may be a contour that extends from the slat trailing edge 109 away from the cove wall 115 such that the slat-cove filler does not contact the cove wall 115 except at the slat trailing edge 109 in the deployed configuration. An example of such an optimal contour 350 is illustrated with single dotted line in FIG. 10. While optimal contour 350 may be desired in a configuration, a slat-cove filler that follows that optimal contour 350 may not provide an opportunity for a structural joint between the slat-cove filler and the cove wall.

Adding a less-than-optimal contour to the aft-most section 208 of the slat-cove filler 1000 affords the opportunity for a structural joint between the slat-cove filler 1000 and the cove wall 115 near the slat trailing edge 109. The less-than-optimal contour to the aft-most section 208 of the slat-cove filler 1000 may also help maintain a thin slat trailing edge thickness, which allows the slat trailing edge 109 to stow tightly against the primary wing structure surface 124, which is illustrated as the single dashed line in FIG. 10.

In typical configurations, the cove wall may be thicker such that when the leading-edge slat 100 is in the retracted positing it is close to the primary wing structure surface 124 as illustrated by the line for thicker cove wall 113. In various embodiments, the inner cove wall 115 may be formed thinner than in typical configurations, as compared to the thicker cove wall 113, to allow more space that could be used to accommodate the slat-cove filler 1000. The requirement for cove wall modification is more significant for slat-cove filler implementations involving a fixed hinge (e.g., FIGS. 1A-D) because of the greater need to make space for stowing the slat-cove filler of fixed curvilinear length. Cove wall modification requirements are much less significant for a sliding slat-cove filler of the various embodiments and may be limited to making room for the sliding slat-cove filler near the slat trailing edge 109 and making the sliding-flexure-hinge 155.

For a fixed-hinge slat-cove filler implementation, the amount and shape of the re-contoured cove wall 115 may vary with span-wise position and may depend upon the shape of the slat-cove filler profile at any given span-wise position. In general, the curvilinear length of the inner cove wall 115, from the slat trailing edge 109 to the root of the cusp (e.g., just forward of 41 in FIGS. 1A-1D) should be approximately equal to the curvilinear length of the slat-cove filler 1000 that stows from the slat trailing edge 109 to the hinge axis of the slat-cove filler (e.g., 41 in FIGS. 1A-1D). It may be undesirable to have a slat-cove filler 1000 with a curvilinear length that is so short that the slat-cove filler 1000 is pulled taught around the outer mold line of the primary wing structure surface 124 as the leading-edge slat 100 and the slat-cove filler 1000 finish retracting. Additionally, it may not be optimal to have a slat-cove filler 1000 with a curvilinear length significantly exceeding that of the cove wall 115 because, although the slat-cove filler 1000 may stow, excessive force may develop between the leading-edge slat 100 and primary wing structure during stowage.

In accordance with various embodiments, the shape-set trailing end 208 may include a sharpest bend at a chord-wise location offset from the slat trailing edge 109. The sharpest bend may curve more dramatically (i.e., having a smaller curvature radius) just forward of a rearward end of the slat-cove filler 1000.

While the shape of the slat-cove filler 1000 with the shape-set trailing end 208 may afford a structural joint between the slat-cove filler 1000 and the cove wall 115 near the slat trailing edge 109, the shape may not match the optimal contour 350 and the deviation from the optimal contour 350 may prove to be unacceptable in some cases. The external auxiliary slat-cove filler component 300 may extend from the trailing end of the leading-edge slat 100 to a central portion of the slat-cove filler 1000 to cover the sharpest bend and correct for the less-than-optimal contour imparted by the sharpest bend.

In accordance with various embodiments, the external auxiliary slat-cove filler component 300 may be included to provide the desired aerodynamic and aeroacoustic performance lost by using the shape-set aft-most section 208 of the slat-cove filler 1000, i.e., matching an optimized slat-cove filler profile (i.e., optimal contour 350) in the aft-most region near the slat trailing edge 109. A joint between the slat-cove filler 1000 and the forward (i.e., lower) end of the external auxiliary slat-cove filler component 300 may be achieved by fastening, soldering, brazing, welding or by adhesive bonding. The strength and durability of an adhesive bond may be enhanced by appropriate surface preparation (e.g., establishment of a fresh, controlled oxide layer), appropriate surface treatment (e.g., priming) and by proper adhesive selection (e.g., containing silane coupling agents to form a chemical bond).

Although the gauge of the external auxiliary slat-cove filler component 300 is likely to be small because of the small chord-wise extent and relatively light aerodynamic loading there, the configuration shown in FIG. 10 may present a small forward-facing step to the air flow. If necessary, the forward-facing step could be filled with a small sliver of relatively stiff elastomeric material. Alternatively, and also if necessary, the external auxiliary slat-cove filler component 300 could be tapered over part or all of the joint with the slat-cove filler 1000 to essentially eliminate any forward-facing step. Tapering could be accomplished by grinding or electric discharge machining. Tapering and joining the external auxiliary slat-cove filler component 300 may involve heating that could locally affect the heat treatment, composition and properties of SMA materials that might be used in that vicinity. However, the joint between the slat-cove filler 1000 and external auxiliary slat-cove filler component 300 is in a region that does not typically experience high strain during slat retraction and slat-cove filler 1000 stowage. Thus, retention of properties in that region of the slat-cove filler 1000 may not be paramount. Furthermore, the geometry and boundary conditions for the external auxiliary slat-cove filler component 300 may be such that large deformations are not anticipated and usage of an SMA material is likely not required in many cases.

Aeroelastic stability and aerodynamic load-bearing capability of the external auxiliary slat-cove filler component 300 may be increased, if needed, by forming it in a stress-free shape, such as that indicated by the dot-dash phantom lines in FIG. 10 so that the external auxiliary slat-cove filler component 300 attains the optimal contour 350 by preloading it during joining/installation. The preload should be sufficient to keep the external auxiliary slat-cove filler component in contact with the slat trailing end and enable it to sustain the local aerodynamic load there, but not so much that it significantly loads the main slat-cove filler 1000 and affects the profile geometry. Alternatively, in the event that greater preload is required for the external auxiliary slat-cove filler component 300, the stress-free profile of the main slat-cove filler 1000 can be adjusted to take the preload into account.

Figure 11:
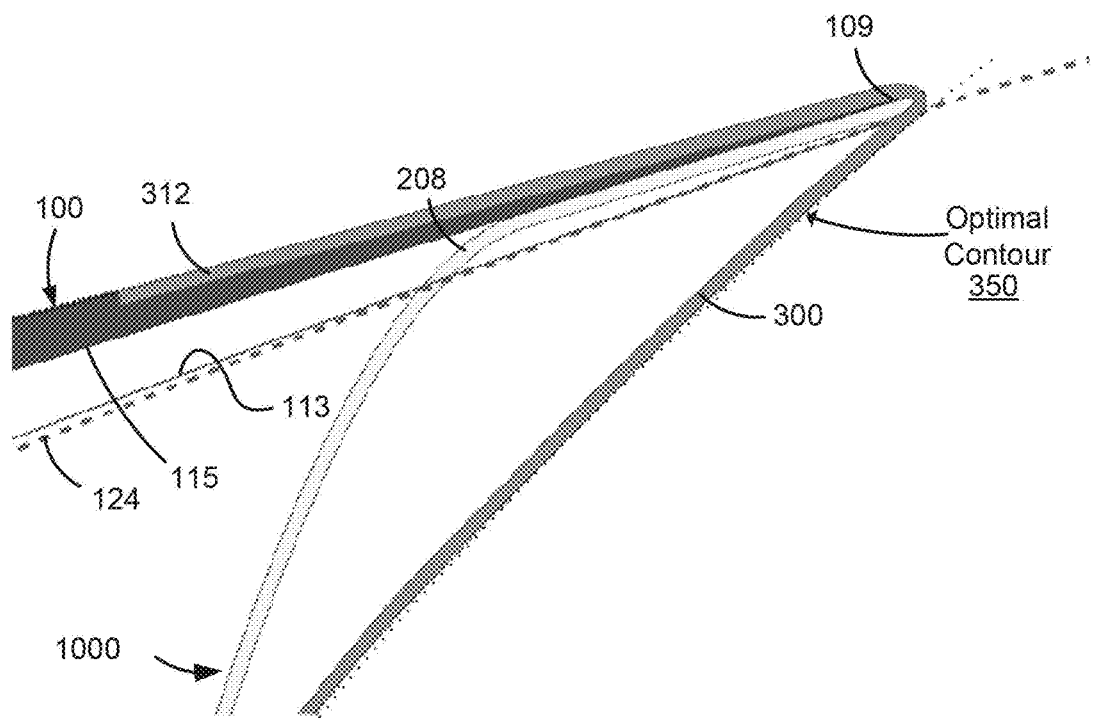
FIG. 11 is a partially fragmentary close-up cross-sectional view of a shape-set trailing end of a sliding slat-cove filler attached to a slat trailing edge along with an external auxiliary slat-cove filler component attached with a lap joint, in accordance with various embodiments.

FIG. 11 illustrates a slat-cove filler 1000 attached to a slat trailing edge 109 along with an external auxiliary slat-cove filler component 300 attached with a lap joint, in accordance with various embodiments. The external auxiliary slat-cove filler component 300 may be wrapped around (i.e., doubled-back upstream) the slat trailing edge 109, and folded over onto a top surface of the leading-edge slat 100 with an extension tag 312 secured thereto in a lap joint configuration. Further thickness reductions could be achieved by ending the slat-cove filler 1000 forward of the slat trailing edge 109 and/or reducing the length of the tag 312 and the corresponding lap joint.

Figure 12:
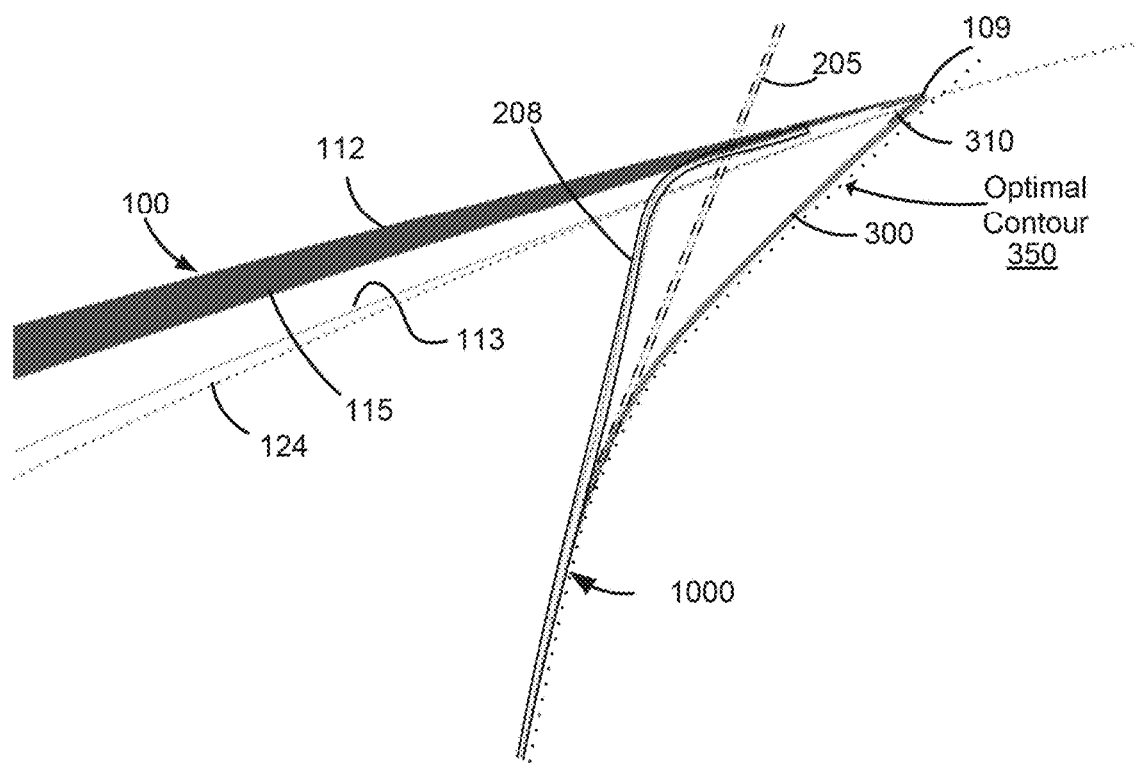
FIG. 12 is a partially fragmentary cross-sectional view of a shape-set trailing end of a sliding slat-cove filler attached to a leading-edge slat forward of a slat trailing edge and an external auxiliary slat-cove filler component attached to the slat trailing edge, in accordance with various embodiments.

FIG. 12 illustrates a shape-set trailing end of a slat-cove filler 1000 attached to a leading-edge slat 100 forward of a slat trailing edge 109 and an external auxiliary slat-cove filler component 300 attached to the slat trailing edge 109 with an aft hinge 310, in accordance with various embodiments. Often, a desirable thickness of the slat-cove filler 1000 needed to sustain expected aerodynamic loads with acceptable deflection may be similar to the desired overall slat trailing edge thickness. In which case, using a slat-cove filler 1000 of requisite thickness for the load that extends to the slat trailing edge 109 will result in an undesirable overall trailing edge thickness. Thus, to achieve a desirable overall trailing edge thickness, a length of the slat-cove filler 1000 may be reduced such that a trailing end thereof terminates forward of the slat trailing edge 109.

As a further alternative, and in accordance with various embodiments, the external auxiliary slat-cove filler component 300 may be attached to the slat trailing edge 109 using the aft hinge 310. In some environments, the external auxiliary slat-cove filler component 300 may tend to depart from the slat trailing edge 109 during stowage and come to nest somewhere forward of the slat trailing edge 109 at full retraction. This behavior may not be of significant consequence since the leading-edge slat 100 would be in contact with the primary wing structure in the retracted position, such that the flow through the gap would be eliminated. However, attachment of the external auxiliary slat-cove filler component 300 at the slat trailing edge 109 may be achieved via a cloth or other ultra-thin hinge (e.g., the aft hinge 310), which may provide increased stability in the external auxiliary slat-cove filler component 300. The external auxiliary slat-cove filler component 300 may be fixedly attached at a central portion of the slat-cove filler 1000 to cover the sharpest bend and correct for the less-than-optimal contour imparted by the sharpest bend.

Figure 13:
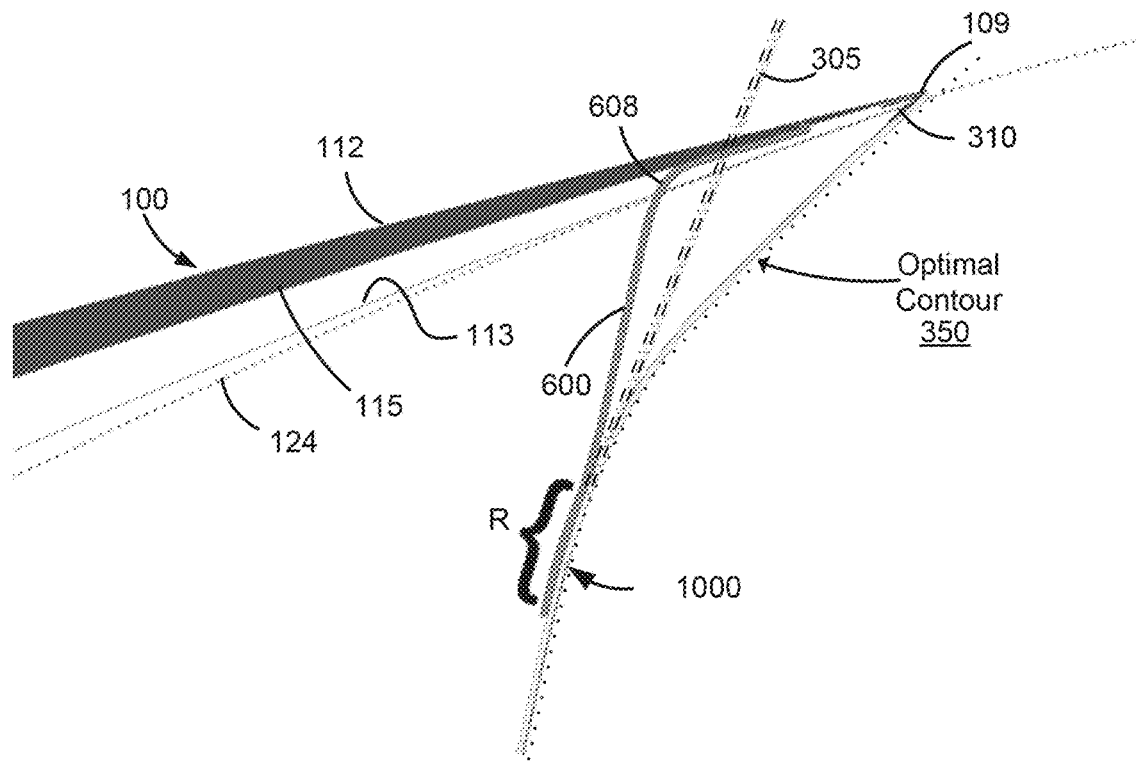
FIG. 13 is a partially fragmentary cross-sectional view of a sliding slat-cove filler attached to a slat trailing edge with an internal auxiliary slat-cove filler component having a shape-set portion attached to a leading-edge slat forward of a slat trailing edge, in accordance with various embodiments.

FIG. 13 illustrates a slat-cove filler 1000 attached to the slat trailing edge 109 with an internal auxiliary slat-cove filler component 600 having a shape-set portion 608 attached to the leading-edge slat 100 forward of a slat trailing edge 109, in accordance with various embodiments. The internal auxiliary slat-cove filler component 600 may be disposed between the slat-cove filler 1000 and the cove wall 115. In this embodiment, the roles of the aft section parts of the slat-cove filler and the auxiliary slat-cove filler component have been swapped from those discussed above with reference to FIGS. 10-12. The slat-cove filler 1000 may follow an optimized slat-cove filler profile (i.e., optimal contour 350) over its entire length, from the cusp to the slat trailing edge 109. In contrast, the internal auxiliary slat-cove filler component 600 may be joined to the slat-cove filler 1000 in a region R that does not experience high strain during the slat retraction/slat-cove-filler stowage process to minimize the influence of the joint on the slat-cove filler 1000 stowage. Because the slat-cove filler 1000 is formed into the optimized slat-cove filler profile (i.e., optimal contour 350) when deployed and hides the internal auxiliary slat-cove filler component 600 from the air flow, the shape of the internal auxiliary slat-cove filler component 600 may only be constrained to suitably attach the slat-cove filler 1000 to the leading-edge slat 100, enable the slat-cove filler 1000 to retain its optimized shape under aerodynamic load, and avoid strain above an acceptable limit during retraction. In this manner, internal auxiliary slat-cove filler component 600 may provide a structural joint between the slat-cove filler 1000 and the cove wall 115. Additionally, and analogous to the above, the internal auxiliary slat-cove filler component 600 may be span-wise discrete because it is hidden from the flow, thereby enabling another parameter to control stiffness and potentially increase mobility of the slat-cove filler 1000 by reducing the coupling between discrete connections of the slat-cove filler 1000 and the slat trailing edge 109.

Analogous to the attachment of the exterior auxiliary slat-cove filler component (300), described above, a joint between the slat-cove filler 1000 and the internal auxiliary slat-cove filler component 600 may be achieved by fastening, soldering, brazing, welding or by adhesive bonding. The strength and durability of an adhesive bond may be enhanced by appropriate surface preparation (e.g., establishment of a fresh, controlled oxide layer), appropriate surface treatment (e.g., priming) and by proper adhesive selection (e.g., containing silane coupling agents to form a chemical bond). The influence of the joint on stowage of the leading-edge slat 100 and the slat-cove filler 1000, i.e., increased thickness and possible reduction in super-elastic capacity, may be minimized by locating the joint in a region of low strain.

Aeroelastic stability and other considerations for the portion of the slat-cove filler 1000 that is above and aft of the joint with the internal auxiliary slat-cove filler component 600 are analogous to those discussed above with regard to FIGS. 10 and 11. Specifically, aeroelastic stability and aerodynamic load-bearing capability could be increased, if needed, in the aft-most section of the slat-cove filler 1000 by forming it in a stress-free shape (indicated as 305 in phantom dot-dash lines in FIG. 13), that attains the optimal contour 350 by preloading it during joining/installation. The preload should be sufficient to keep the aft-most section of the slat-cove filler 1000 in contact with the slat trailing edge 109 and enable it to sustain the local aerodynamic load there, but not so much that it significantly loads the internal auxiliary slat-cove filler 600 and affects the overall profile geometry. Alternatively, in the event that greater preload is required for the aft-most section of the slat-cove filler 1000, the stress-free profile of the internal auxiliary slat-cove filler component 600, and/or the section of slat-cove filler 1000 forward and below the joint with the internal auxiliary slat-cove filler component 600, can be adjusted to take the preload into account.

The slat-cove filler 1000 in configurations like that in FIG. 13 may tend to depart (i.e., pull away) from the slat trailing edge 109 during stowage and come to nest somewhere forward of the trailing end at full retraction. Like before, this behavior may not be significant since the leading-edge slat 100 would be in contact with the primary wing structure in the retracted mode, such that the flow through the gap would be eliminated during that event. However, as described above, the slat-cove filler 1000 may be attached at the slat trailing edge 109 via a cloth or other ultra-thin hinge aft hinge 310. Increased stability in the slat-cove filler 1000 may also be achieved by including the aft hinge 310. The internal auxiliary slat-cove filler component 600 may be fixedly attached at a central portion of the slat-cove filler 1000.

Some embodiments may involve increasing the structural integrity of integrating the slat cove filler 1000 into the slat trailing edge 109 and/or reducing the actuation authority required and the contact forces involved in stowing the slat cove filler 1000 during slat retraction.

Figure 14:
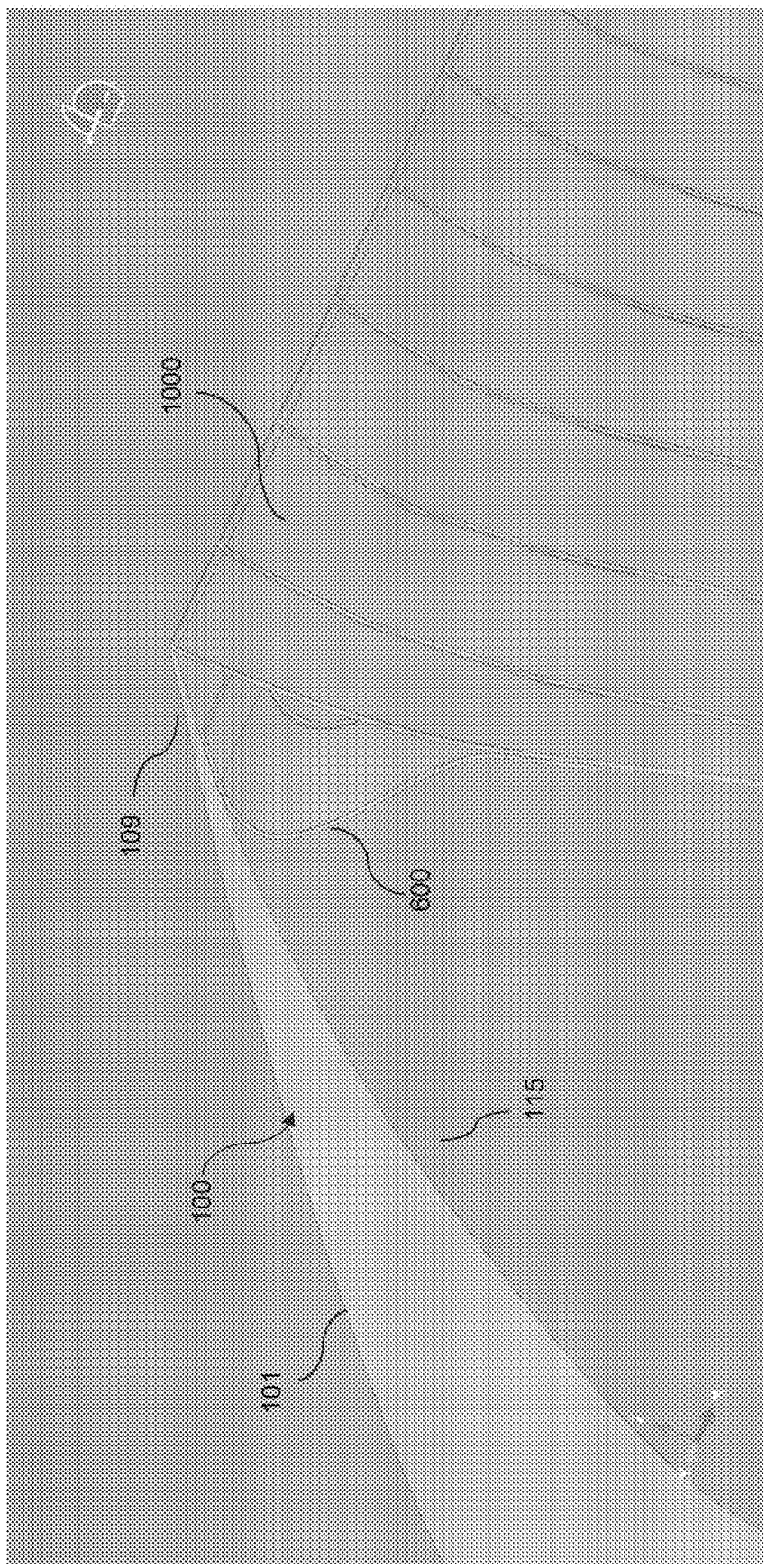
FIG. 14 is a partially fragmentary isometric view of a portion of a trailing section of the leading-edge slat with a slat-cove filler, with an internal auxiliary slat-cove filler component attaching the slat-cove filler to the cove wall, in accordance with various embodiments.

As may be seen in FIG. 13 and FIG. 14, slat 100 is relatively thin where the internal auxiliary slat-cove filler component 600 attaches and there is relatively little parametric space to adjust this connection for structural improvement. However, some embodiments may require an increase in structural strength, stiffness, and durability of the joint between the slat cove filler 1000 and the slat trailing edge 109 without compromising the response of the structure under aerodynamic load, or the structural performance during slat 100 retraction and deployment. With reference to FIG. 14, although the attachment location for the internal auxiliary slat-cove filler component 600 (also referred to as "internal auxiliary component 600") to the slat 100 can be made forward of that for the deviated-slat cove filler approach, geometric, strain, and force constraints limit the options for achieving forward adjustment of that joint. The shape of an internal auxiliary component 600 designed to attach further forward becomes intractable quickly with increased forward movement of the joint. Also, the deformation mechanics of the internal auxiliary component 600 is such that the main slat-cove filler 1000 would tend to depart from slat trailing edge 109 during stowage and come to nest somewhere forward of/below the slat trailing edge 10 at full retraction. This behavior is of no significant consequence to the flow because slat cove filler 1000 would be in contact with the main wing 21 (not shown), such that the flow through the gap would be eliminated during that event. However, forward/downward movement of the slat cove filler 1000 at slat trailing edge 109 would cause more of a leading section of slat cove filler 1000 to be forced under the base of the slat cove wall 115 and into the body of the slat 100. The available space in the body of slat 100 is limited, so this behavior could be unworkable. Embodiments may include a configuration of internal auxiliary component 600 that prevents the forward/downward movement of the slat cove filler 1000, where attachment of the main slat cove filler 1000 at the slat trailing edge 109 could be achieved via a cloth or other ultra-thin aft hinge 310 (FIG. 13), or via another method. Increased stability of the slat cove filler assembly 1000 could be achieved by this optional hinge method, which may be attached to the inner surfaces of the slat cove wall 115 and slat cove filler 1000 to avoid affecting the flow.

Figure 15:
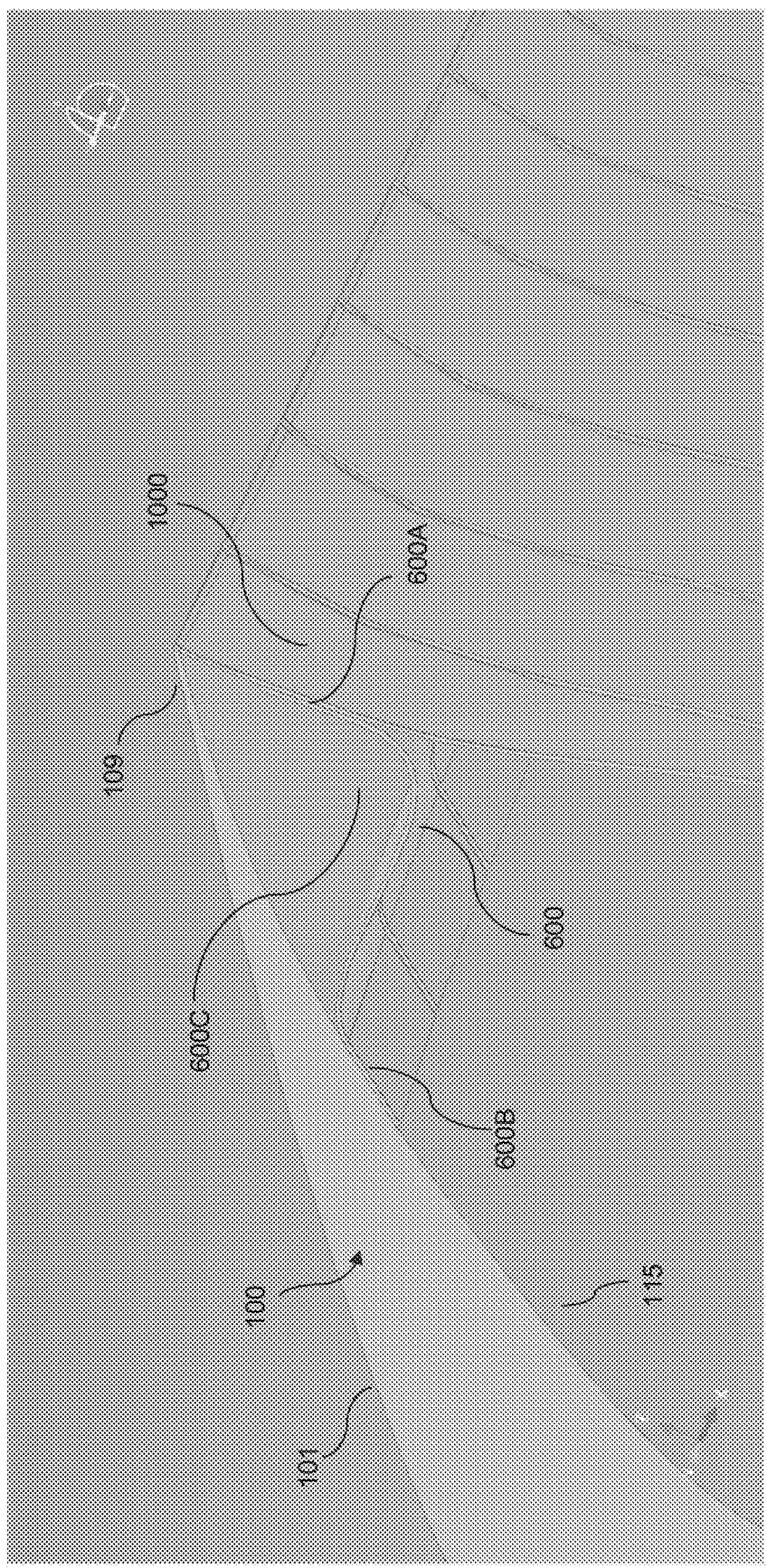
FIG. 15 is a partially fragmentary isometric view of a portion of a trailing section of the leading-edge slat with a slat-cove filler, with a reverse configuration of internal auxiliary slat-cove filler component attaching the slat-cove filler to the cove wall, in accordance with various embodiments.

Reversing the orientation of the internal auxiliary component 600, as shown in FIG. 15, changes the design space considerably and introduces opportunities for improved structural integrity. In general, the shapes of the main or reverse auxiliary components 600 and the geometric details of the joint between them need only be constrained by the requirements that (i) the outer mold line (OML) of the slat-cove filler 1000 attain the optimized profile when deployed; (ii) the slat-cove filler 1000 maintain the optimized profile at the OML while under aerodynamic load; and (iii) that components avoid strain in excess of the allowable limit during retraction/stowage of the slat 100 and slat-cove filler 1000.

The configuration shown in FIG. 15 is an example of a working system that satisfies the constraints for the High Lift Common Research Model (HL-CRM) Lacy, Doug S. and Sclafani, Anthony J.: "Development of the High Lift Common Research Model (HL-CRM): A Representative High Lift Configuration for Transonic Transports," AIAA 2016-0308, AIAA SciTech 2016 Forum, San Diego, CA, 4-8 Jan. 2016. However, this configuration has not been optimized. Aspects of the reverse auxiliary slat-cove filler configuration that could be optimized include the thickness distribution of both components, the locations of the joints with the main slat-cove filler 1000 and slat 100, the shape and curvature distribution in the reverse internal auxiliary component 600 and the spanwise segmentation. For example, in regard to the spanwise segmentation, the spanwise segmentation matches between the main and reverse internal auxiliary components 600 in the example shown in FIG. 15. However, it is possible that a coarser distribution of reverse internal auxiliary components 600 is advantageous.

An aspect of the reverse configuration is that the joint between the reverse auxiliary component 600 (FIG. 15) and the slat trailing section (trailing edge 109) can be made in a leading portion far forward of that possible for the original configuration (e.g., as shown in FIGS. 13 and 14). The forward or leading joint location of the reverse internal auxiliary component 600 to the slat 100 offers great advantages in terms of joint stiffness, strength and durability because the joint is made where the slat section is much thicker. Additionally, the joint between the reverse internal auxiliary component 600 and main slat-cove filler 1000 components can be made further up and aft, to a trailing portion on the main components of the slat-cove filler 1000 relative to the original configuration. Thus, in a reverse configuration, the internal auxiliary component 600 has a first end 600A attached to a trailing portion of slat-cove filler 1000 and a second end 600B attached to the cove wall 115 of slat 100 forward of the attachment to the slat-cove filler 1000. This configuration change may offer greater and more-efficient control over the stiffness of the trailing section of the main slat-cove filler 1000, which could be unattached to the slat 100, through trades of main slat-cove filler 1000 and internal auxiliary component 600 thickness, the relative sizes of the components, the part of each component that is controlling stiffness of the trailing section and the fact that the reverse internal auxiliary component 600 need not span the entire spanwise length of each slat-cove filler 1000 assembly. As previously established, internal with respect to auxiliary component 600 means disposed between main slat cove filler 1000 and slat cove wall 115 into the cove region of the leading-edge slat 100. Internal auxiliary component 600 may be open in a concave manner to the cove wall 115 of slat 100 where the reverse internal auxiliary component 600 has a forward orientation at the attachment to the cove wall 115 and an aft orientation at the attachment to the main slat cove filler 1000. Reverse with respect to this configuration of internal auxiliary component 600 could thus be described as follows. Slat-cove filler 1000 may have an internal auxiliary slat-cove filler component 600 with a first component end 600A and a second component end 600B. The internal auxiliary slat-cove filler component 600 may be attached at the first end 600A to a trailing portion of the slat-cove filler 1000 facing the cove wall 115 and the second end 600B to the cove wall 115 forward of the attachment to the slat-cove filler 1000. The internal auxiliary slat-cove filler component 600 may thus be configured to be disposed in a curved or curving manner in the interior space between the cove wall 115 and slat-cove filler 1000, such that when the leading-edge slat 100 is in the deployed position, at least one concavity 600C of the internal auxiliary slat-cove filler component 600 is open to and facing the cove wall 115.

A joint between the main slat-cove filler 1000 and reverse internal auxiliary component 600 can be achieved by fastening, soldering, brazing, welding or by using adhesives. A fastened joint is not practical at small scale, but it is relevant for full-scale, transport-class aircraft applications because of the material thicknesses involved. The strength and durability of an adhesive bond could be enhanced by appropriate surface preparation (e.g., establishment of a fresh, controlled oxide layer), appropriate surface treatment (e.g., priming) and by proper adhesive selection (e.g., silane coupling agents to form a chemical bond). Joining processes such as soldering, brazing and welding involve heat that could locally affect the heat treatment, composition and properties of SMA materials in that vicinity. However, the joint region is small and it is possible to minimize the heat affected zone by proper processing methods. Also, the joint between the slat-cove filler 1000 and internal auxiliary component 600 is in a region of the main slat-cove filler 1000 that does not typically experience high strain during retraction and stowage.

Structural stability and aerodynamic load-bearing capability could be increased, if needed, in the reverse configuration by forming one or both of slat-cover filler 1000 and internal auxiliary component 600 such that they are preloaded during joining/installation in bringing the aft/upper edge of the main slat-cove filler 1000 in contact with the slat trailing edge 109. The preload should be sufficient to keep the internal auxiliary component 600 in contact with slat trailing edge 109 and enable it to sustain the local aerodynamic load at that point, but not so much that it significantly loads the main slat-cove filler 1000 component or affects the profile geometry.

With a reverse configuration of internal auxiliary component 600, the deformation mechanics differ from that of the original configuration in that the main slat-cove filler 1000 component would tend to depart from the slat trailing edge 109 in the opposite direction during stowage, and come to equilibrium somewhere aft or above the slat trailing edge 109 at full retraction. Contrary to the original configuration, this behavior is significant to the flow because an additional aft facing step would be presented to the flow in the cruise configuration. However, it could be possible to design the structure of the reverse internal auxiliary component 600 to avoid the aft/upward deformation tendency, and the behavior is clearly preventable by designing sliding constraint in the joint between the reverse internal auxiliary component 600 and the slat trailing section. The design of the sliding joint between the reverse internal auxiliary component 600 and the slat trailing section can be optimized to keep the slat-cove filler 1000 assembly inside the slat cove region 35 (not shown), i.e., to prevent protrusion into the flow on the top of the wing 21, while also avoiding the tendency of forcing more of the main slat-cove filler 1000 leading section under the base of the slat cove wall 115 and into the body of slat 100. As with the original internal auxiliary component 600, it is possible that a configuration of reverse auxiliary component 600 could be conceived that would prevent the aft/upward movement of the slat-cove filler 1000 assembly, where attachment of the main slat-cove filler 1000 component at the slat trailing edge 109 could be achieved via a cloth or other ultra-thin hinge, similar to optional aft hinge 310, or by another method (e.g., a bulbous type sliding-flexure-hinge, roller in rolling engagement, optional bias elements, etc.) Increased stability of the slat-cove filler 1000 assembly could also be achieved by this optional hinge method, which would be attached to the inner surfaces of the slat cove and slat-cove filler 1000, to avoid affecting the flow. This configuration could also include a mechanical stop 210 for slat-cove filler 1000.

Minimizing weight, complexity and reliance on auxiliary systems are important goals in slat cove filler design. It is for these reasons that many embodiments focus on a purely passive approach that achieves stowage only through slat actuation authority and deployment only by structural restoring force in the slat-cove filler. Extension of slat-cove filler technology to practical three-dimensional (3D) implementation requires reevaluation of requirements and constraints, as well as reestablishment of priorities and best practices. A discussion of a purely passive approach continues, first followed by consideration of assistive actuation.

As discussed above, a sliding flexure hinge concept for the forward/lower connection of a slat-cove filler assembly to the slat is generally required, instead of a traditional fixed-hinge connection, for any wing section that exhibits an optimized slat-cove filler contour length that significantly exceeds the curvilinear length of the corresponding cove wall. An additional advantage of the sliding hinge concept is that it guarantees monostable behavior and a smooth release of strain energy (restoring force) during deployment of the stowed slat-cove filler, which is in stark contrast to the usually impulsive release of configurations of slat-cove fillers involving a fixed hinge. This impulsive release of strain energy is a characteristic of fixed hinge systems, whether they are monostable or bistable. The impulsiveness can be diminished by optimization, but the available parameters for multi-objective optimization on other design metrics become very constrained. Finally, the sliding hinge concept has proven, through 3D simulation, to be a natural way to accommodate variation in a 3D airframe configuration including sweep, taper and even local geometric features that arise from 3D aerodynamic design of a wing.

Implementation of a slat-cove filler treatment on a 3D airframe application could favor the sliding flexure hinge for a forward connection to the slat. However, incorporating the sliding flexure hinge in a slat-cove filler design can increase the requirement for actuation authority to stow the slat-cove filler. The increased actuation authority requirement is demonstrated in FIG. 16 for the two-dimensional (2D) case shown in FIG. 17, in comparison to a fixed hinge configuration that was previously studied for the same 2D case. It can be seen that the authority requirement of the traditional and sliding implementations are similar over much of the stowage process. However, there is a clear difference between the two near completion of stowage. The fixed hinge configuration shows relaxation associated with a near-stable stowed configuration while the sliding flexure hinge exhibits significantly increased authority requirement due to additional bending strain energy not present in the fixed hinge case. Thus, the configurations suitable for 3D implementation (sliding flexure hinge) suggest reassessment of slat-cove filler actuation for stowage and deployment.

Figure 16:
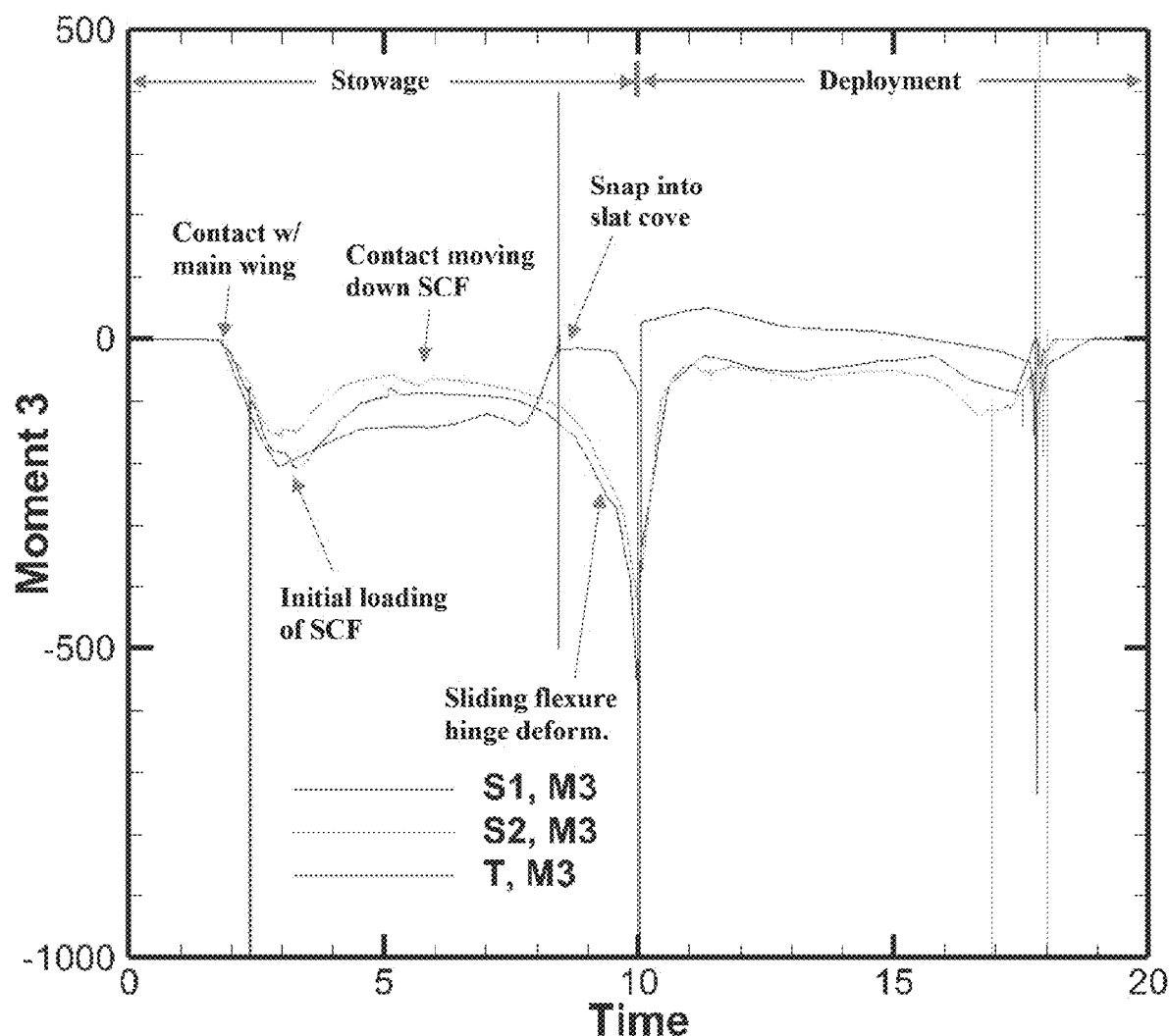
FIG. 16 is a graph of response quantity indicative of stowage effort (moment) over time for slat-cove filler stowage and deployment.
Figure 17:
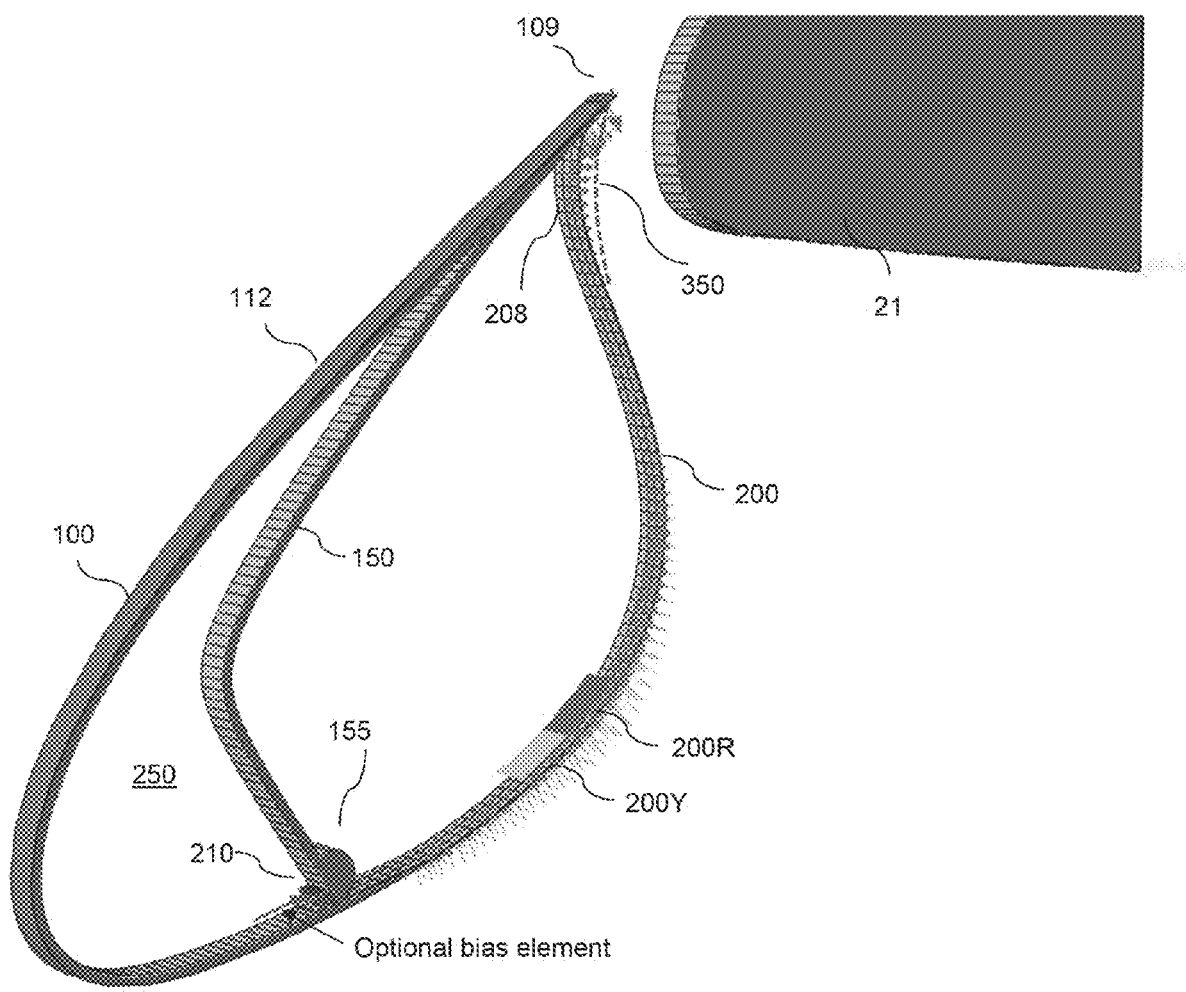
FIG. 17 is a partially fragmentary isometric view of a portion of a primary wing structure, a leading-edge slat with a sliding-flexure-hinge, and a sliding slat-cove filler, in accordance with various embodiments.

The trends in FIG. 16 suggest the following aspects with regard to slat actuation of the sliding flexure hinge embodiments. The stiffness of the aft/upper connection of the slat-cove filler 1000 assembly to the slat 100 governs the actuation requirement in the initial part of stowage starting at the time of first contact of the main slat-cove filler 1000 to the main wing 21 (~2 seconds in FIG. 16) and ending at the local peak in actuator authority requirement (~3 seconds in FIG. 16). This is largely because the aft/upper connection of the slat-cove filler 1000 to the slat 100 is taking all of the deformation in this initial phase of stowage, while the forward section of slat-cove filler 1000 slides into the body of slat 100, and the restoring force from that strain energy is in close proximity to the center of contact between the main slat-cove filler 1000 and the main wing 21. The restoring force in the slat cove-filler 1000 increases and is balanced by increasing moment arm between the contact center and the slat-cove filler 1000 to slat 100 connection to limit the contact force growth. Then the required actuation authority diminishes and plateaus in the central part of stowage. This behavior is attributable to the center of contact moving away from the aft/upper connection, with that connection having peaked out in strain energy and still dominating the overall strain energy in the slat-cove filler 1000. Finally, the required actuation authority increases significantly in the latter phase of slat-cove filler 1000 stowage due to the additional strain energy that is developed in the sliding flexure hinge and its close proximity to the contact center at this stage of stowage.

Considering the parameters involved in such embodiments, there are at least two approaches available for reducing the strain energy and restoring force that is developed in the sliding flexure hinge. First, the curvature distribution at the base of the cove wall (termed the bulb, about which the sliding flexure bends) and its location (forward/aft) relative to the cove wall can be tailored to reduce strain and to adjust clearance (i.e., between the cove wall and main wing). Secondly, the stiffness of the slat-cove filler can be tailored to the embodiment. Tailoring of the slat-cove filler stiffness may be accomplished by thickness and/or material variation, and other approaches that could be discrete in nature, such as joined slat-cove filler sections of different thickness, or continuous, as could be achieved via laminated materials or functionally graded materials produced by additive manufacturing. The rapidly developing field of additive manufacturing is particularly promising for the slat-cove filler applications because it can offer simultaneous control over thickness and material composition.

Figure 18:
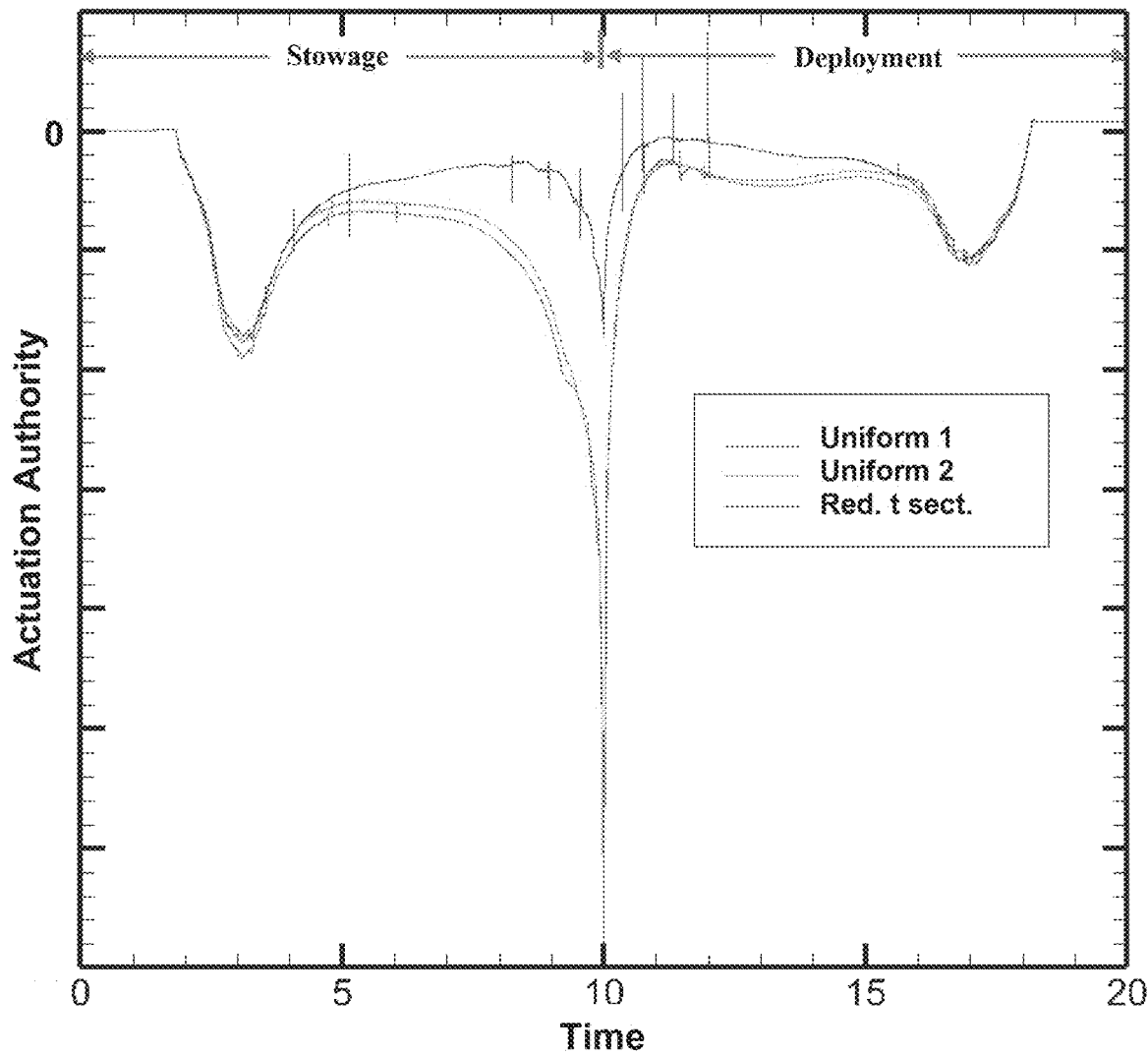
FIG. 18 is a graph of response quantity indicative of stowage effort (actuation authority) over time of slat-cove filler stowage and deployment.

A simple example of actuator authority reduction by discrete thickness change is shown in FIG. 18 for the same case as that considered previously in FIG. 16. The two cases labeled as uniform thickness (Uniform 1 and Uniform 2) are nominally the same as the results shown in FIG. 16 for the sliding flexure hinge case. The reduced thickness result ("Red. t sect.") corresponds to the isometric view case shown in FIG. 17 (i.e., with element numbering similar to the isometric views in FIGS. 2A-2D), where the thickness was reduced by half in the sections colored red 200R and yellow 200Y. The red section 200R corresponds to the portion of the slat cove filler 200 that is bent around the bulb at the completion of stowage. The yellow section 200Y indicates the additional length that is involved in bending under the bulb in earlier stages of stowage. It can be seen that significant reductions can be achieved by thickness changes. Additional significant reduction can be achieved via modifications to the curvature distribution and location of the bulb, as indicated above, while it is noted that these changes would have to be balanced with structural performance under aerodynamic load. Additionally, thinning in regions where there is increased curvature in the slat-cove filler, red region or further aft, or where the aerodynamic load is known to be lighter are guiding factors. Reduction in strain energy in other parts of the slat cove filler, most-notably at the upper/aft connection to the slat, is also desirable without incurring loss of load-bearing capability in flow. Optimal contour 350 may be seen near aft most section 208 of slat cove filler 200.

Slat-cove filler 1000 (i.e., returning to numbering of FIG. 15) embodiments that require the internal auxiliary component 600 configuration at the aft or upper connection to the slat 100 would exhibit different deformation mechanics in, and restoring force development from, that part of the assembly in comparison to the deviated configuration. However, the goal of minimizing actuation authority required to stow the slat-cove filler 1000 remains the same. For all parameters, e.g., bulb curvature and placement, main slat-cove filler 1000 thickness distribution, and configuration and thickness distribution of the internal auxiliary component 600, structural optimization can be employed to minimize the required actuator authority for stowage while satisfying the aerodynamic load requirements and other constraints.

Again, an optimized stiffness distribution can be realized by thickness and/or material composition control.

Figure 19:
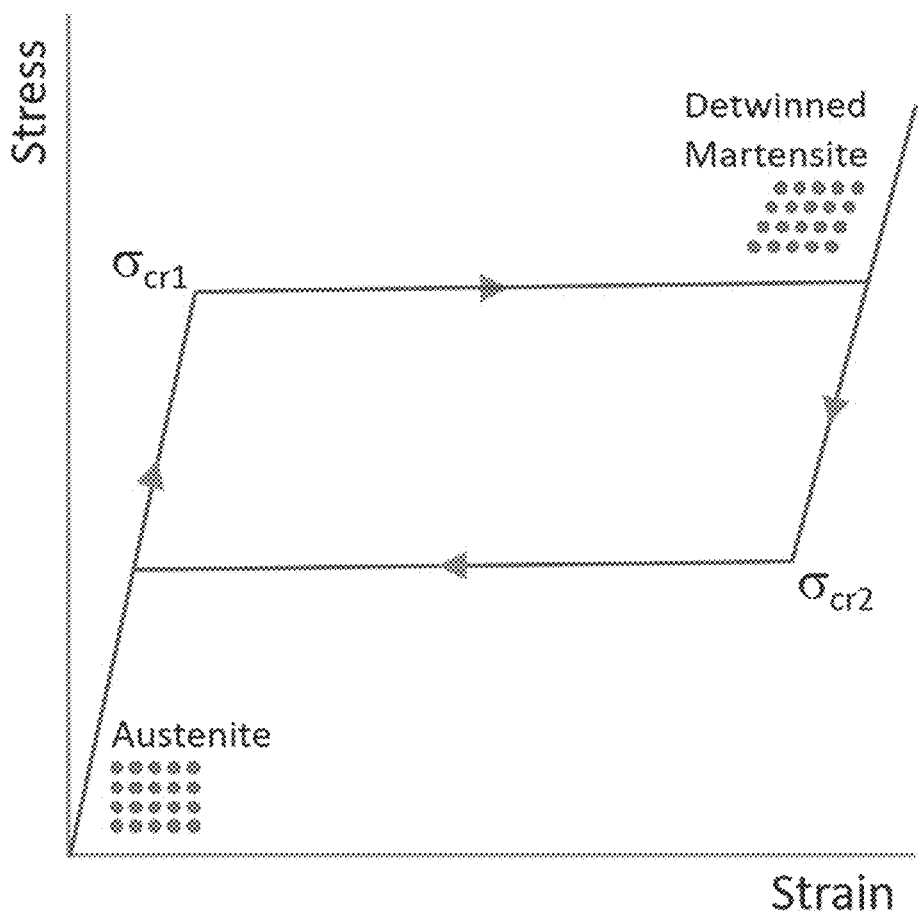
FIG. 19 is an idealized σ-ε diagram for super-elastic shape memory alloy materials.

It is clear from graphics depicting slat 100 and slat-cove filler 1000 articulation that portions of the slat-cove filler 1000 may undergo large deformation during retraction of the slat 100 and stowage of the slat-cove filler 1000. Super-elastic (also "superelastic" or "SE") SMA materials have been considered in some embodiments for enabling the massive configuration change and sustain aerodynamic load. An idealized σ-ε diagram for super-elastic SMA materials is shown in FIG. 19, which shows that the material can undergo large deformation due to applied stress and regain its original configuration upon stress removal.

The manner in which the SE SMA material is employed can be described as follows. A stress-free shape of SE SMA material in a slat-cove filler 1000 may be that of the deployed configuration and the deployed slat-cove filler 1000 should be in the austenitic phase. The contact force developed between the slat-cove filler 1000 and the main wing during retraction of slat 100 generates stress in the regions that are required to transform and stow the slat-cove filler 1000. The restoring force developed in slat-cove filler 1000 during stowage redeploys the slat-cove filler 1000 during deployment of slat 100.

SE SMA material content in the structure of slat-cove filler 1000 embodiments should generally be fully austenitic at all approach and landing conditions in order to enable passive and autonomous deployment of the slat-cove filler 1000 and sustainment of aerodynamic load in the deployed configuration. Consider the stress-temperature phase diagram schematic for SMA materials shown in FIG. 20. The transformation temperatures ($M_f$, $M_s$, $A_s$ and $A_f$) increase with applied stress. The slopes of the stress-temperature relationships are designated as stress influence coefficients $C_M$ and $C_A$. Phase information is shown for two different materials having identical stress-free transformation temperatures. The stress influence coefficients for material 1 are high, which results in a small region of superelasticity, and those for material 2 are much lower, affording a greatly expanded region of superelasticty.

Figure 20:
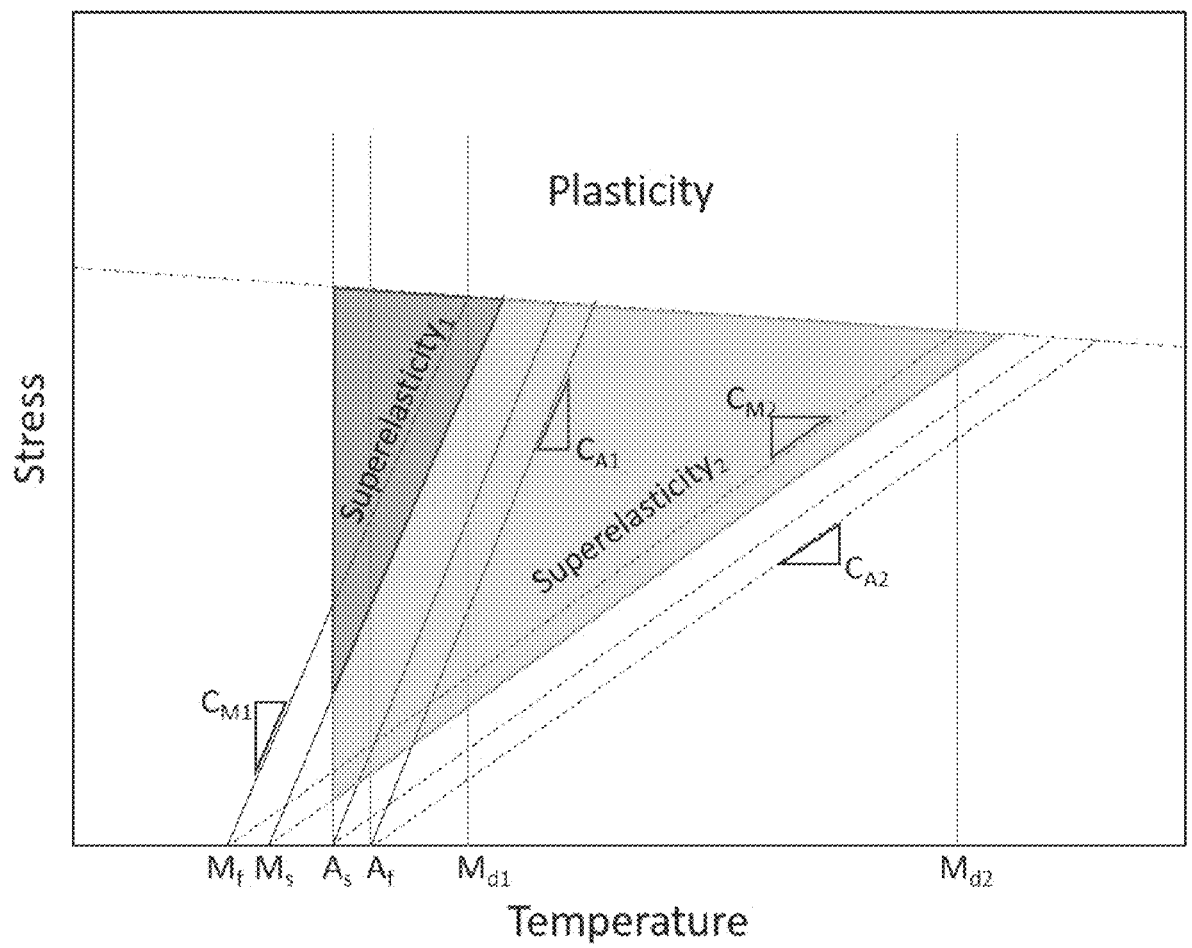
FIG. 20 is a schematic of a stress-temperature phase diagram for two superelastic shape memory alloy compositions demonstrating the phase transformation temperatures and highlighting the effect of stress-influence coefficients in controlling the region of superelasticity.

With respect to FIG. 20, design for this embodiment of a passive and autonomous slat-cove filler 1000 employing super-elastic SMA material requires the SMA material to be fully austenitic at all approach and landing conditions, i.e., $A_f$ below the coldest landing condition (perhaps −50° F.). For SE SMA materials that exhibit high stress influence coefficients, an extreme stress level could be required to stress-induce martensite or plastic (irrecoverable) deformation may be induced instead at hot landing conditions (say 115° F.) if the temperature is above $M_d$. (e.g., $M_{d1}$ in FIG. 20). This is a significant problem in general because many known SMAs exhibit high stress influence coefficients, and in particular for aircraft applications because of the very large temperature range involved in a typical flight envelope. One solution is to employ an SMA material meeting the requirement of $A_f$ below the coldest landing condition and exhibiting lower stress influence coefficients, as also indicated in FIG. 20. Recent research has demonstrated progress in producing SMA materials with such characteristics, e.g., NiTi-based SMAs with specific material processing parameters and an iron-based alloy composition with recoverable strain similar to NiTi. Another solution to this challenge is to specify a "warmer" material system, with an $A_f$ significantly above the coldest landing condition, and heat the SMA in landing conditions that demand it. This latter approach could be accomplished with an alloy that is still processed for super-elasticity, but it also opens the design landscape to include SMA materials designed and processed for a "shape memory effect" (sometimes denoted by "SME" or "shape memory" or "SM" material.)

Additional reductions in the actuation authority required for stowage of slat-cove filler 1000 could be achieved by employing an SM SMA material, instead of the SE SMA and laminated composite materials considered previously, as explained subsequently. SMA materials exhibit a phase transformation between a high-temperature (typically cubic) microstructure called austenite and a low-temperature (typically monoclinic, orthorhombic or tetragonal) microstructure called martensite in response to changes in temperature and applied stress. The austenite phase is highly ordered so it has a unique crystalline configuration and macroscopic shape, i.e., the memorized shape, while the martensite phase is much less ordered such that multiple crystalline configurations and macroscopic shapes are possible.

Figure 21:
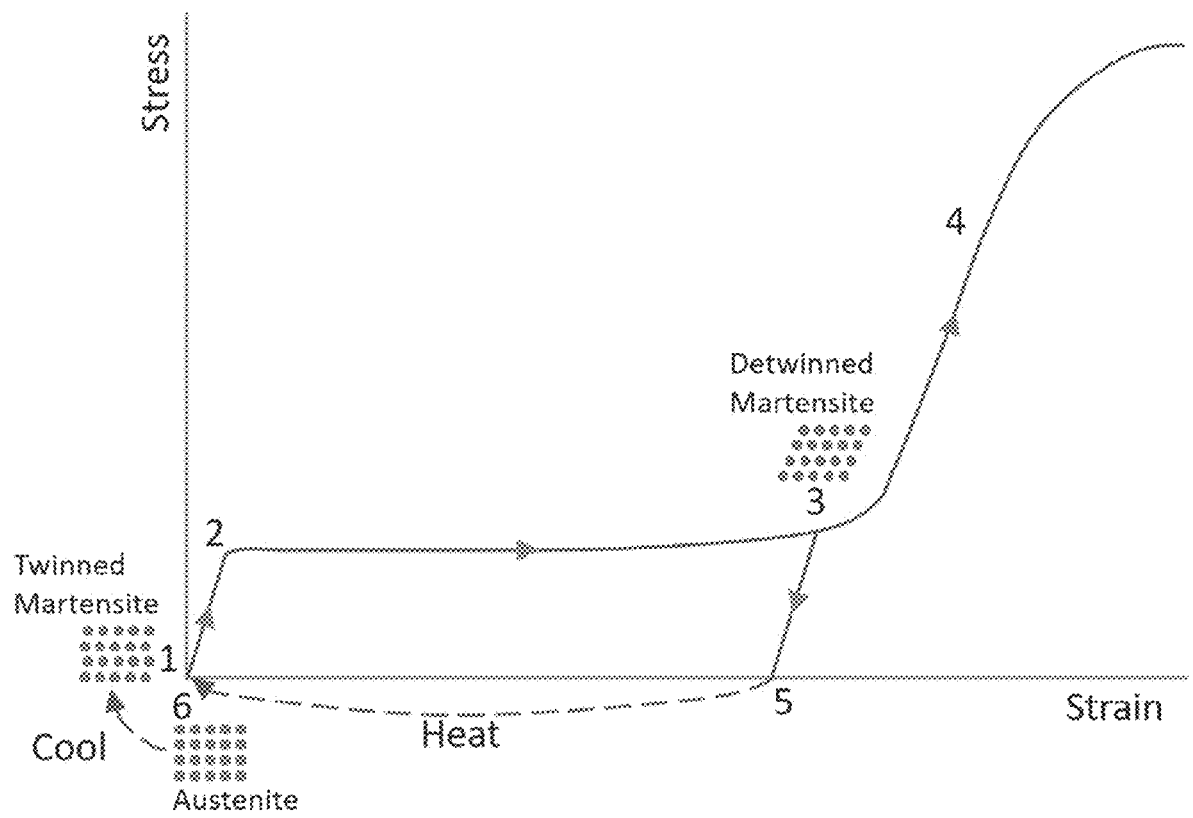
FIG. 21 is a schematic of the stress-strain response of a shape memory effect, shape memory alloy demonstrating detwinning or martensite reorientation strain due to stress and recovery of that inelastic strain by heating to the austenite phase.

Consider an SMA material with a composition that renders the material in the martensitic phase at all operating temperatures without heat stimulus, i.e., all operating temperatures are cool to the alloy. Unique features of this material behavior are shown in the idealized σ-ε diagram in FIG. 21. The state denoted by the number 1 corresponds to the material in the twinned martensitic condition, having been cooled from the high temperature phase without mechanical load so that the martensite forms as self-accommodating twins that produce no macroscopic configuration change from the memorized, high-temperature phase/shape. The material is easily deformed at a critical stress for martensite variant reorientation, which is denoted by 2 in FIG. 21 and is characteristically much lower than that required for stress induction of martensite in a superelastic or SE alloy. Large deformation is achieved by the material system with little additional stress via an increasing percentage of martensite variants that are reoriented (detwinned) to favor the direction of the applied load. Continued increase of load/stress results in complete reorientation/detwinning of the available martensite variants (3 in FIG. 21) followed by linear elastic deformation of the detwinned material that eventually becomes dominated by plasticity (4 in FIG. 21). Unloading the material at 3, in FIG. 21, or at lower stresses, i.e., with insignificant dislocations in the microstructure, allows the material to recover elastic strain, but the strain due to reorientation is retained, corresponding to 5 in FIG. 21. The residual strain can be recovered by applying heat to raise the temperature of the material above the finish temperature for reverse transformation to austenite and the structure returns to the unique shape in that phase (6 in FIG. 21). Subsequent cooling of the material returns the microstructure to twinned martensite without macroscopic change in the structural shape (back to 1 in FIG. 21.)

The functionality of incorporating SM, as opposed to SE, SMA material for the slat cove filler application can be described as follows. The "memorized" austenitic (high temperature) shape corresponds to the deployed slat-cove filler 1000 configuration. Upon cooling from the shape set condition, the slat-cove filler 1000 in the martensitic phase retains the memorized shape in the absence of significant stress. The contact between the slat-cove filler 1000 and main wing 21 during retraction of slat 100 develops the stress necessary to deform the slat-cove filler 1000. The martensitic phase is easily deformed by variant reorientation in regions of highest stress, where the critical stress required for martensite reorientation is characteristically lower than that required to stress induce martensite in a typical SE SMA. Thus, the restoring force developed in the slat-cove filler 1000 is only that due to elastic deformation of the detwinned martensite, and is quite low. Application of heat is required to return the slat-cove filler 1000 to the deployed position, but that deployment to the memorized shape comes with significant authority. It is also important to note that, in addition to the martensite reorientation stress in a SM SMA material being typically lower than the critical stress for transformation to martensite in an SE SMA material, the martensite reorientation stress typically decreases with increasing temperature, which could lead to excellent compatibility with the slat-cove filler 1000 application.

The functionality of the slat-cove filler 1000 incorporating the SM SMA material described above can be achieved (and is likely preferable) by only strategic parts of the slat-cove filler 1000 possessing the SME behavior. As an example, the strategic parts of the slat-cove filler 1000 for SME behavior might be a section near or proximate to the slat trailing edge 109 and the section forming the sliding flexure hinge, i.e., a section that resides under and bends around the bulb at the base of the cove wall 115 at final stowage. Furthermore, it is likely that some embodiments may be implemented with only the internal auxiliary components 600 having the SME behavior in that configuration at the slat trailing edge 109. This has the following additional advantages in terms of actuation on the aft/upper section of the slat-cove filler 1000 assembly. The internal auxiliary component 600 is hidden from the freestream flow so heating the components is much easier and more efficient than heating the main slat-cove filler 1000. The internal auxiliary components 600 are relatively small chordwise and could be of small spanwise extent as well, such that heating requirements are small. Application of surface or other electrical heating (e.g., Joule or induction) is facilitated by the close proximity of the internal auxiliary components 600 to the slat 100, i.e., easy access for surface heaters or similar devices. Alternatively, the internal auxiliary components 600 could be heated by hot bypass air, which is often available in the leading edge slat 100 for deicing, that would also be facilitated by the close proximity of the internal auxiliary components 600 to the slat structure and aided in efficiency by protection from freestream flow provided by the main slat-cove filler 1000 components. Other methods of heating the internal auxiliary components 600 could also be devised, which would undoubtedly be facilitated and enhanced by the close proximity of the SM SMA material sections to the slat 100 and the sheltered configuration provided by the main slat-cove filler 1000 components.

In various embodiments, at least a portion of slat-cover filler 1000 may include shape memory (SM) effect shape memory alloy (SMA) material. Several options exist for the leading section of the slat-cove filler 1000. SM SMA material could be limited to just the portion of the main slat-cove filler 1000 that is bent around the bulb at the base of the cove wall at final stowage (e.g., red section in FIG. 17). It could extend further forward to include all parts of the main slat-cove filler 1000 that see bending strain during stowage of slat cove filler 1000 (e.g., yellow section in FIG. 17) or it could comprise the entire leading section of the main slat-cove filler 1000 (red section forward to leading edge in FIG. 17). The first case minimizes the extent and involvement of the SM SMA material, which could be a factor for performance under aerodynamic load and could aid in maintaining a configuration better suited to sliding action at the forward constraint early in the stowage process. The last case could aid in the stowage of the leading section in the slat 100 by allowing that portion to readily deform to the shape of the slat internal volume, i.e., reduce binding internal to the body of slat 100. Like the application of SM SMA material at the aft/upper structural connection to the slat 100, the portion of the slat-cove filler 1000 involving SM SMA material at the forward/lower structural joint may either be internal or in close proximity to the slat 100 in implementation. Thus, heating of the SM SMA material during deployment to return to the memorized shape could be readily accomplished via hot bypass air, often already in the slat 100 for deicing, or electrical or other heading methods enabled by contact with the slat structure. Note that by either heating method, bypass air and/or contact heating, the implementation could be done so that the SM SMA material is heated to achieve the memorized shape as it pays out of the body of slat 100, which could be particularly advantageous because the portion forward of the sliding flexure hinge (still in stowage) could remain martensitic. Finally, it can be seen that this heating configuration at the sliding flexure hinge location is also shielded from freestream flow and that greatly improves efficiency.

Although changes in material composition with location in the slat-cove filler 1000 could be achieved discretely, joints that promote corrosion and geometric and stress discontinuity can be avoided by additive manufacturing. Slat-cove filler 1000 thickness distribution was not included in the description above on SM SMA material sections in the slat-cove filler 1000, but it is clearly another parameter critical to overall stiffness, strength, and durability. Additive manufacturing is a natural way to achieve optimized thickness and material composition, i.e., SM vs SE, distribution simultaneously in the slat-cove filler 1000. The optimized functional gradient in material properties could be between the two types, i.e., SE and SM, and/or it could be within one material type, i.e., SE or SM. Composition and material property variations within a specific material type can result in control of transformation temperatures and critical stress values. Recent research has shown that functional gradients in material composition and corresponding material properties are achievable by additive manufacturing methods. Specification of the optimized parameters, e.g., material composition and thickness distributions, shape and position of the bulb, etc., can be achieved through multi-objective optimization. Recent research has shown that such multi-objective optimization is tractable, even with incorporation of aeroelastic effects, via sparse high fidelity physics based methods in combination with advanced surrogate modeling methods.

Discrete actuation concepts could be advantageous in conjunction with actuation attributable to the SME in portions of the slat-cove filler 1000 and/or alone. For example, it was previously suggested that the forward edge of the main slat-cove filler 1000, supported under the base of the slat cove wall 115, should be acted upon by a constant force spring or the like to aid in maintaining the deployed configuration of the slat-cove filler 1000 under aerodynamic load when necessary. However, this approach comes at the expense of additional stiffness against stowage, albeit light and constant with increasing slat cove filler stowage. A mechanical stop 210 or discrete actuator in the form of a cam or something similar could be employed to make the action at the forward edge of the slat cove filler 1000 binary. At all parts of the flight envelope other than approach and landing, when the slat 100 and slat-cove filler 1000 are fully deployed, the stop 210 cam mechanism (or similar mechanical stop) may be positioned to hold the forward section of the slat-cove filler 1000 against the inner surface of the body of slat 100 via the bulb structure or rollers such that the slat-cove filler 1000 can freely enter and exit the body of slat 100 as slat 100 moves. When the slat-cove filler 1000 reaches the fully deployed position, which only occurs at approach and landing, the stop 210 or cam mechanisms may rotate to a position a stop, catch or something similar to hold the slat-cove filler 1000 in the deployed position until the slat 100 moves to a position that is again compatible with slat-cove filler 1000 movement.

Actuation to bias the slat-cove filler 1000 to the stowed configuration during retraction of slat 100 could also be advantageous in reducing the slat 100 actuation authority requirement and contact forces involved in stowage of slat-cove filler 1000. Rotary actuators again factor due to their compact form factor. Thus, embodiments may include a wing structure with a leading-edge slat 100 having a cove wall 115, a sliding-flexure-hinge extending from the cove wall, and defining an interior space within the leading-edge slat 100, where the leading-edge slat 100 is configured to movably interconnect with the primary wing structure for movement between a retracted position and a deployed position. The wing structure may also include a slat-cove filler 1000 of flexible material that defines a first shape when the leading-edge slat 100 is in the deployed position and a second shape when the leading-edge slat 100 is in the retracted position. A leading end of the slat-cove filler 1000 can be configured to slide along the sliding-flexure-hinge into the interior space when the leading-edge slat 100 is moving toward the deployed position and out of the interior space when the leading-edge slat 100 is moving toward the retracted position, as with other embodiments. At least a portion of the slat-cove filler 1000 may be comprised of shape memory (SM) effect shape memory alloy (SMA) material, wherein the shape memory (SM) effect shape memory alloy (SMA) material is selected to have a predetermined application temperature below a finish temperature for transformation to martensite. In this way, the at least a portion of the slat-cove filler 1000 comprising shape memory (SM) effect shape memory alloy (SMA) material is configured such that application of heat to the at least a portion of the slat-cove filler 1000 causes the leading end of the slat-cove filler 1000 to slide along the sliding-flexure-hinge into the interior space when the leading-edge slat 100 is moving toward the deployed position. The application of heat to the at least a portion of the slat-cove filler 1000 could also be used to cause the slat-cover filler 1000 to achieve a desired shape relative to the wing structure. In some embodiments, the wing structure could include a slat-cove filler 1000 having reverse internal auxiliary slat-cove filler component 600 as described above, which may in some cases be the at least a portion of the slat-cove filler 1000 comprising 1000 comprising shape memory (SM) effect shape memory alloy (SMA) material.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A wing structure for an aircraft, comprising:
   a primary wing structure;
   a leading-edge slat comprising:
      a cove wall;
      a sliding-flexure-hinge extending from the cove wall; and
      an interior space within the leading-edge slat, wherein the leading-edge slat is configured to movably interconnect with the primary wing structure for movement between a retracted position and a deployed position;
   a slat-cove filler comprising a flexible material and defining a first shape when the leading-edge slat is in the deployed position and a second shape when the leading-edge slat is in the retracted position, wherein a leading end of the slat-cove filler is configured to slide along the sliding-flexure-hinge into the interior space when the leading-edge slat is moving toward the retracted position and out of the interior space when the leading-edge slat is moving toward the deployed position; and
   wherein the slat-cove filler comprises an internal auxiliary slat-cove filler component having a first component end and a second component end, the internal auxiliary slat-cove filler component attached at the first end to a trailing portion of the slat-cove filler facing the cove wall and the second end to the cove wall forward of the attachment to the slat-cove filler, the internal auxiliary slat-cove filler component configured to be disposed in a curved manner in the interior space between the cove wall and slat-cove filler when the leading-edge slat is in the deployed position, with at least one concavity of the internal auxiliary slat-cove filler component open to the cove wall.

2. The wing structure of claim 1, wherein the leading end of the slat-cove filler includes a mechanical stop.

3. The wing structure of claim 2, wherein the sliding-flexure-hinge is a bulbous type sliding-flexure-hinge.

4. The wing structure of claim 2, wherein the sliding-flexure-hinge includes at least one roller in rolling engagement with the slat-cove filler.

5. The wing structure of claim 2, wherein the leading end of the slat-cove filler includes a bias element configured to apply a bias force to the mechanical stop or directly to the leading end of the slat-cove filler itself.

6. The wing structure of claim 1, wherein at least a portion of the slat-cove filler comprises shape memory (SM) effect shape memory alloy (SMA) material.

7. The wing structure of claim 6, wherein the shape memory (SM) effect shape memory alloy (SMA) material is selected to have a predetermined application temperature below a finish temperature for transformation to martensite.

8. The wing structure of claim 6, wherein the at least a portion of the slat-cove filler comprising shape memory (SM) effect shape memory alloy (SMA) material is configured such that the application of heat to the at least a portion of the slat-cove filler causes the leading end of the slat-cove filler to slide along the sliding-flexure-hinge into the interior space when the leading-edge slat is moving toward the retracted position.

9. The wing structure of claim 8, wherein the application of heat to the at least a portion of the slat-cove filler further causes the slat-cover filler to achieve a desired shape relative to the wing structure.

10. The wing structure of claim 8, wherein the at least a portion of the slat-cove filler comprising shape memory (SM) effect shape memory alloy (SMA) material includes the internal auxiliary slat-cove filler component.

11. A wing structure for an aircraft, comprising:
    a primary wing structure;
    a leading-edge slat comprising:

a cove wall;

a sliding-flexure-hinge extending from the cove wall; and an interior space within the leading-edge slat, wherein the leading-edge slat is configured to movably interconnect with the primary wing structure for movement between a retracted position and a deployed position; and a slat-cove filler comprising a flexible material and defining a first shape when the leading-edge slat is in the deployed position and a second shape when the leading-edge slat is in the retracted position, wherein a leading end of the slat-cove filler is configured to slide along the sliding-flexure-hinge into the interior space when the leading-edge slat is moving toward the retracted position and out of the interior space when the leading-edge slat is moving toward the deployed position; wherein at least a portion of the slat-cove filler comprises shape memory (SM) effect shape memory alloy (SMA) material, wherein the shape memory (SM) effect shape memory alloy (SMA) material is selected to have a predetermined application temperature below a finish temperature for transformation to martensite.

12. The wing structure of claim 11, wherein the at least a portion of the slat-cove filler comprising shape memory (SM) effect shape memory alloy (SMA) material is configured such that application of heat to the at least a portion of the slat-cove filler causes the leading end of the slat-cove filler to slide along the sliding-flexure-hinge into the interior space when the leading-edge slat is moving toward the retracted position.

13. The wing structure of claim 12, wherein the application of heat to the at least a portion of the slat-cove filler further causes the slat-cover filler to achieve a desired shape relative to the wing structure.

14. The wing structure of claim 11, wherein the leading end of the slat-cove filler includes a mechanical stop.

15. The wing structure of claim 14, wherein the sliding-flexure-hinge is a bulbous type sliding-flexure-hinge.

16. The wing structure of claim 14, wherein the sliding-flexure-hinge includes at least one roller in rolling engagement with the slat-cove filler.

17. The wing structure of claim 14, wherein the leading end of the slat-cove filler includes a bias element configured to apply a bias force to the mechanical stop or directly to the leading end of the slat-cove filler itself.

18. The wing structure of claim 11, wherein the leading end of the slat-cove filler further comprises an internal auxiliary slat-cove filler component having a first component end and a second component end, the internal auxiliary slat-cove filler component attached at the first end to a trailing portion of the slat-cove filler facing the cove wall and the second end to the cove wall forward of the attachment to the slat-cove filler, the internal auxiliary slat-cove filler component configured to be disposed in a curved manner in the interior space between the cove wall and slat-cove filler when the leading-edge slat is in the deployed position, with at least one concavity of the internal auxiliary slat-cove filler component open to the cove wall.

19. The wing structure of claim 18, wherein the at least a portion of the slat-cove filler comprising shape memory (SM) effect shape memory alloy (SMA) material includes the internal auxiliary slat-cove filler component.

* * * * *